US012254844B2

(12) United States Patent
Jeong et al.

(10) Patent No.: US 12,254,844 B2
(45) Date of Patent: Mar. 18, 2025

(54) DISPLAY DRIVING CIRCUIT AND OPERATING METHOD THEREOF

(71) Applicant: SAMSUNG ELECTRONICS CO., LTD., Suwon-si (KR)

(72) Inventors: Jiyong Jeong, Suwon-si (KR); Yongjoo Song, Suwon-si (KR); Jeongah Ahn, Suwon-si (KR); Hajun Lee, Suwon-si (KR); Youngsub Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/213,632

(22) Filed: Jun. 23, 2023

(65) Prior Publication Data

US 2023/0335066 A1 Oct. 19, 2023

Related U.S. Application Data

(63) Continuation of application No. 16/803,042, filed on Feb. 27, 2020, now Pat. No. 11,727,888.

(30) Foreign Application Priority Data

Apr. 22, 2019 (KR) ........................ 10-2019-0046943

(51) Int. Cl.
*G09G 3/3233* (2016.01)
*G09G 3/3225* (2016.01)
(Continued)

(52) U.S. Cl.
CPC ..... *G09G 3/3291* (2013.01); *G09G 2310/027* (2013.01)

(58) Field of Classification Search
CPC ......................... G09G 3/3291; G09G 2310/27
See application file for complete search history.

(56) References Cited

U.S. PATENT DOCUMENTS 5,206,944 A 4/1993 Pilkenton
6,653,962 B2 11/2003 Gupta et al.
(Continued)

FOREIGN PATENT DOCUMENTS

CN 105741783 A 7/2016
CN 105895007 A 8/2016
(Continued)

OTHER PUBLICATIONS

Communication dated Nov. 28, 2023 issued by the Korean Patent Office in Application No. 10-2019-0046943.
(Continued)

*Primary Examiner* — Lin Li
(74) *Attorney, Agent, or Firm* — Sughrue Mion, PLLC

(57) ABSTRACT

A display driving circuit is provided. The circuit drives a display panel that includes data lines, sensing lines, and sub-pixels connected to the data lines and the sensing lines. The display driving circuit includes a data driver integrated circuit that drives the data lines. The data driver integrated circuit includes a driving block and a sensing block. The driving block includes plural digital-analog converters (DACs) each performing digital-analog conversion with respect to received sub-pixel data to generate output voltages and provide the output voltages of the DACs to the data lines. The sensing block measures grayscale voltages output from the DACs in a first operation mode and measures pixel voltages of the sub-pixels received from the sensing lines in a second operation mode.

20 Claims, 15 Drawing Sheets

(51) Int. Cl.

| | |
|---|---|
| ***G09G 3/3258*** | (2016.01) |
| ***G09G 3/3275*** | (2016.01) |
| ***G09G 3/3291*** | (2016.01) |
| ***G09G 3/36*** | (2006.01) |
| ***H10K 50/805*** | (2023.01) |

(56) References Cited

U.S. PATENT DOCUMENTS

| | | | | | |
|---|---|---|---|---|---|
| 7,263,148 | B2 | 8/2007 | Chang et al. | | |
| 7,750,837 | B2 | 7/2010 | Wang et al. | | |
| 7,847,489 | B2 | 12/2010 | Lin | | |
| 7,906,995 | B2 | 3/2011 | Payne et al. | | |
| 8,115,414 | B2 | 2/2012 | Zhao et al. | | |
| 8,253,655 | B2 | 8/2012 | Yu et al. | | |
| 8,400,080 | B2 | 3/2013 | Tan et al. | | |
| 9,349,311 | B2 | 5/2016 | Yu et al. | | |
| 9,373,281 | B2 | 6/2016 | Wu et al. | | |
| 9,396,675 | B2 | 7/2016 | Kim et al. | | |
| 9,397,667 | B2 | 7/2016 | Ingimundarson | | |
| 9,583,043 | B2 | 2/2017 | Mizukoshi | | |
| 9,601,050 | B2 | 3/2017 | Wu et al. | | |
| 9,685,119 | B2 | 6/2017 | Kim et al. | | |
| 9,838,134 | B1 | 12/2017 | Rope et al. | | |
| 9,858,862 | B2 | 1/2018 | Kwon et al. | | |
| 9,875,687 | B2 | 1/2018 | Han et al. | | |
| 9,898,962 | B2 | 2/2018 | Yang et al. | | |
| 9,947,271 | B2 | 4/2018 | Wang et al. | | |
| 9,978,969 | B2 | 5/2018 | Shin et al. | | |
| 10,110,152 | B1 | 10/2018 | Hajati | | |
| 10,116,391 | B2 | 10/2018 | Rope et al. | | |
| 10,380,942 | B2 | 8/2019 | An et al. | | |
| 10,460,662 | B2 | 10/2019 | Song et al. | | |
| 2009/0027377 | A1* | 1/2009 | Kwon | G09G 3/3233 | 345/214 |
| 2010/0302285 | A1 | 12/2010 | Yamanaka | | |
| 2011/0122119 | A1* | 5/2011 | Bae | G09G 3/3233 | 345/211 |
| 2013/0050292 | A1* | 2/2013 | Mizukoshi | G09G 3/3233 | 345/77 |
| 2014/0204071 | A1* | 7/2014 | Kwon | G09G 3/3291 | 345/82 |
| 2015/0062192 | A1* | 3/2015 | Kim | G09G 3/3233 | 345/690 |
| 2015/0206502 | A1* | 7/2015 | Hwang | G09G 3/3618 | 345/82 |
| 2016/0063910 | A1 | 3/2016 | An | | |
| 2016/0071445 | A1 | 3/2016 | Kim et al. | | |
| 2016/0078813 | A1* | 3/2016 | Mizukoshi | G09G 3/3233 | 438/23 |
| 2016/0098961 | A1* | 4/2016 | Han | G09G 3/3291 | 345/83 |
| 2016/0104428 | A1* | 4/2016 | In | G09G 3/3275 | 345/214 |
| 2016/0117986 | A1 | 4/2016 | Wang et al. | | |
| 2016/0163265 | A1 | 6/2016 | Yang et al. | | |
| 2016/0189595 | A1 | 6/2016 | Choi et al. | | |
| 2016/0189635 | A1* | 6/2016 | Lee | G09G 3/3291 | 345/77 |
| 2016/0203764 | A1* | 7/2016 | In | G09G 3/3233 | 345/215 |
| 2017/0082438 | A1 | 3/2017 | Rastegar et al. | | |
| 2018/0151112 | A1* | 5/2018 | Song | G09G 3/3258 | |
| 2018/0166515 | A1* | 6/2018 | An | G09G 3/3225 | |
| 2018/0182277 | A1 | 6/2018 | Zeng | | |
| 2018/0182288 | A1* | 6/2018 | Kim | G09G 3/3233 | |
| 2019/0027095 | A1* | 1/2019 | Kim | H10K 50/805 | |
| 2019/0304370 | A1* | 10/2019 | Lu | G09G 3/3258 | |

FOREIGN PATENT DOCUMENTS

| | | | |
|---|---|---|---|
| CN | 108231008 | A | 6/2018 |
| KR | 10-1577909 | B1 | 12/2015 |
| KR | 10-2016-0030652 | A | 3/2016 |
| KR | 10-2018-0061476 | A | 6/2018 |
| KR | 10-2018-0067152 | A | 6/2018 |

OTHER PUBLICATIONS

Communication issued Jan. 21, 2024 by China Intellectual Property Office in Chinese Patent Application No. 202010180325.8.

Communication issued Jan. 24, 2025 by the Korean Patent Office in Application No. 201900046943.

* cited by examiner

DISPLAY DRIVING CIRCUIT AND OPERATING METHOD THEREOF

CROSS-REFERENCE TO RELATED APPLICATION

This application is a Continuation Applications of U.S. application Ser. No. 16/803,042, filed on Feb. 27, 2020, which claims priority from Korean Patent Application No. 10-2019-0046943, filed on Apr. 22, 2019, in the Korean Intellectual Property Office, the disclosure of which is incorporated by reference herein in its entirety.

BACKGROUND

1. Field

Apparatuses, devices, and methods consistent with the present disclosure relate to a semiconductor device, and more particularly, to a display driving circuit that drives a display panel such that an image is displayed on the display panel, and an operating method of the display driving circuit.

2. Description of Related Art

A display apparatus includes a display panel to display an image and a display driving circuit to drive the display panel. The display driving circuit may drive the display panel by receiving image data from outside and applying an image signal, which corresponds to the received image data, to a data line of the display panel. Recently, organic light-emitting diode (OLED) display panels are more widely used, in which a plurality of sub-pixels of a pixel array each include an OLED.

In an OLED display panel, when electrical properties between the sub-pixels such as threshold voltages and mobilities of driving transistors provided in the sub-pixels are non-uniform and the electrical properties are changed due to, for example, degradation of sub-pixels, quality of an image displayed on the OLED display panel may degrade. Therefore, research has been performed into technologies provide compensation for this degradation.

SUMMARY

It is an aspect to provide a display driving circuit in which degradation of image quality according to output offsets of a plurality of digital-analog conversion circuits provided in a data driver may be prevented, and an operating method of the display driving circuit.

According to an aspect of one or more embodiments, there is provided a display driving circuit configured to drive a display panel, the display panel comprising a plurality of data lines, a plurality of sensing lines, and a plurality of sub-pixels connected to the plurality of data lines and the plurality of sensing lines, the display driving circuit comprising a data driver integrated circuit configured to drive the plurality of data lines, wherein the data driver integrated circuit comprises a driving block comprising a plurality of digital-analog converters (DACs) each configured to perform digital-analog conversion with respect to received sub-pixel data to generate output voltages and provide the output voltages of the plurality of DACs to the plurality of data lines; and a sensing block configured to measure grayscale voltages output from the plurality of DACs in a first operation mode and measure pixel voltages of the plurality of sub-pixels received from the plurality of sensing lines in a second operation mode.

According to another aspect of one or more embodiments, there is provided a display driving circuit comprising a data driver which includes a driving block configured to generate a plurality of data voltages, internally extract, in a calibration mode, a plurality of data voltages output from the driving block, and read, in a sensing mode, a plurality of pixel voltages received from a plurality of sub-pixels of a display panel; and a timing controller configured to perform data compensation for image data provided to the data driver based on electrical properties of the plurality of sub-pixels and based on output properties according to channels of the driving block extracted based on the plurality of data voltages, and provide the compensated image data to the data driver.

According to another aspect of one or more embodiments, there is provided an operation method of a display driving circuit performing data compensation for received image data, the operation method comprising measuring, by a data driver, output properties according to channels of a driving block configured to generate data voltages to be provided to a display panel; measuring, by the data driver, electrical properties of a plurality of sub-pixels of the display panel; and driving the display panel, by the data driver, based on compensated image data based on the output properties and based on the electrical properties.

According to another aspect of one or more embodiments, there is provided a display driving circuit comprising a data driver integrated circuit configured to drive, by a plurality of digital-analog converters (DACs), a plurality of data lines of a display panel, to determine compensation data for image data, and to perform calibration of the DACs in a calibration mode to generate calibration data; and a timing controller configured to perform data compensation for the image data provided to the data driver integrated circuit based on the compensation data and the calibration data, and provide the compensated image data to the data driver integrated circuit.

BRIEF DESCRIPTION OF THE DRAWINGS

Embodiments will be more clearly understood from the following detailed description taken in conjunction with the accompanying drawings in which.

DETAILED DESCRIPTION

Hereinafter, various embodiments will be described with reference to the accompanying drawings.

Figure 1:
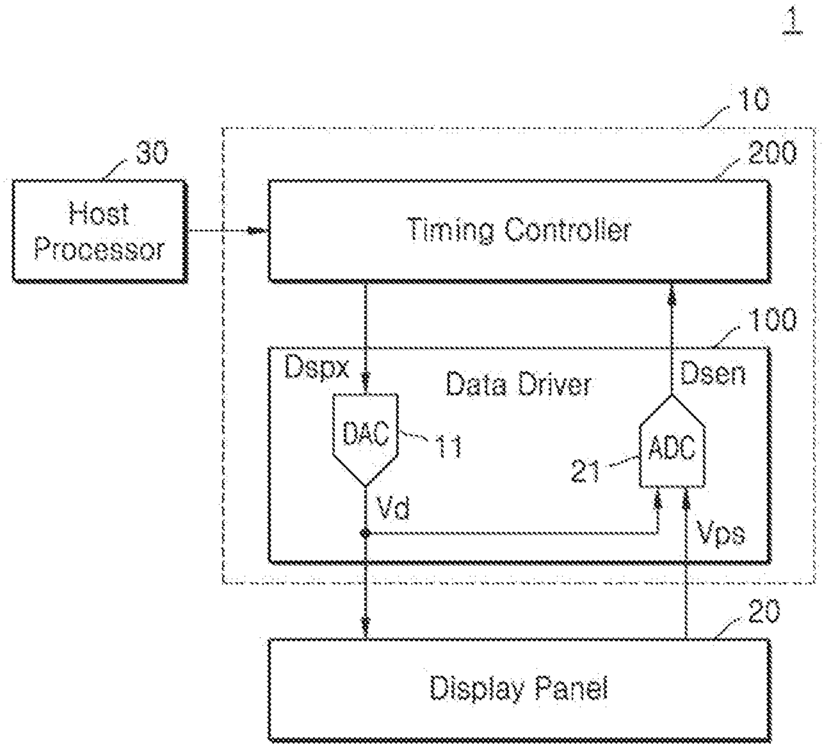
FIG. 1 is a block diagram of a display system according to an example embodiment.

FIG. 1 is a block diagram of a display system according to an example embodiment.

A display system 1 according to an example embodiment may be mounted in an electronic device having an image display function. For example, the electronic device may include a smartphone, a tablet personal computer (PC), a portable multimedia player (PMP), a camera, a wearable device, a television, a digital video disk (DVD) player, a refrigerator, an air conditioner, an air purifier, a set-top box, various types of medical instruments, a navigation device, a global positioning system (GPS) receiver, a device for vehicle, furniture, various types of measuring devices, or the like.

Referring to FIG. 1, the display system 1 may include a display driving circuit 10, a display panel 20, and a host processor 30, and the display driving circuit 10 may include a timing controller 200 and a data driver 100. The display driving circuit 10 may further include a gate driver 300 (see FIG. 2).

In general, the host processor 30 may control the display system 1. The host processor 30 may generate image data to be displayed on the display panel 20 and transmit the image data and control commands to the display driving circuit 10. The host processor 30 may be a graphics processor. However, the host processor 30 is not limited thereto and may be realized as various types of processors such as a microprocessor, a multi-media processor, and an application processor. In some embodiments, the host processor 30 may be realized as an integrated circuit (IC) or a system on chip (SOC).

The display panel 20 includes a pixel array that includes a plurality of signal lines and a plurality of pixels. The plurality of pixels are arranged in the form of a matrix. Each pixel in the pixel array may include a plurality of sub-pixels SPX (see FIG. 2). Sub-pixels of various color combinations may construct one pixel. For example, red (R), green (G), and blue (B) sub-pixels may construct one pixel. In other words, the pixel may have an RGB structure. However, the pixel is not limited thereto and may further include white (W) sub-pixels for enhancing luminance, or alternatively, the pixel may be realized by a combination of sub-pixels of other colors.

In some embodiments, the display panel 20 may be an organic light-emitting diode (OLED) display panel in which each sub-pixel includes an OLED. However, the display panel 20 is not limited thereto and may be realized as another type of tablet display or a flexible display panel.

The timing controller 200 may control driving timings of the data driver 100 and gate driver 300 based on the control commands received from the host processor 30. The timing controller 200 may perform various image processes for changing a format of the image data, compensating for electrical properties of the sub-pixels of the display panel 20, reducing power consumption and the like with respect to the image data received from the host processor. For example, when the display panel 20 has an RGBW structure and the received image data has an RGB data format corresponding to the RGB structure, the timing controller 200 may perform a data format change process to change the data format of the image data from the RGB data format to an RGBW data format.

The data driver 100 may convert image data, which is received from the timing controller 200, to an analog data signal and provide the analog data signal to the display panel 20 to drive the display panel 20. In addition, the data driver 100 may measure electrical properties of the plurality of sub-pixels. The data driver 100 may drive the display panel 20 in a display mode and measure the electrical properties of the plurality of sub-pixels in a sensing mode.

The data driver 100 may include a digital-analog converter (DAC) 11 (referred to as DAC hereinafter) and an analog-digital converter (ADC) 21 (referred to as ADC hereinafter). The DAC 11 may be referred to as a channel driver. For convenience of explanation, one DAC 11 and one ADC 21 are shown in FIG. 1, but the data driver 100 may actually include a plurality of DACs 11 and at least one ADC 21. The plurality of DACs 11 may each drive one signal line (for example, a data line DL) (see FIG. 2) of the display panel 20 or time-divisionally drive a plurality of signal lines.

The image data received from the host processor 30 may include pieces of sub-pixel data Dspx respectively corresponding to the plurality of sub-pixels. The DAC 11 may convert the sub-pixel data Dspx to an analog data signal, that is, a data voltage Vd, and provide the data voltage Vd to the sub-pixel. The data voltage Vd may be a grayscale voltage corresponding to a data value of the sub-pixel data Dspx from among a plurality of grayscale voltages.

The ADC 21 may convert an analog sensing value, which is measured according to electrical properties of the sub-pixel, to a digital signal. For example, in the sensing mode, the ADC 21 may read-out a pixel voltage Vps provided from the display panel 20 as sensing data Dsen.

The data driver 100 may provide the sensing data Dsen to the timing controller 200, and the timing controller 200 may, based on the sensing data Dsen, perform image processing to compensate for deviation between electrical properties of the plurality of sub-pixels and/or degradation of the plurality of sub-pixels. The timing controller 200 may extract the electrical properties of each of the plurality of sub-pixels based on the sensing data Dsen, determine a compensation value based on the electrical properties, and store the compensation value. The timing controller 200 may, based on the compensation value, provide compensation for sub-pixel data to be provided to each of the plurality of sub-pixels. As described above, in compensation for the electrical properties of the plurality of sub-pixels, a data compensation method of compensating a data value of sub-pixel data to be provided to the sub-pixel is referred to as external compensation.

Meanwhile, in the display system 1 according to FIG. 1, the timing controller 200 may, when performing external compensation, apply an output property, that is, an output offset (a difference between an established output voltage and an actual output voltage; referred to as an offset hereinafter) to the DAC 11 of the data driver 100. To do so, in a calibration mode, the data driver 100 may provide an output of the DAC 11, that is, a data voltage Vd, to the ADC 21, and the ADC 21 may read-out the data voltage Vd. In some embodiments, the DAC 11 may output data voltages Vd corresponding to all or some of grayscales that may be represented by the sub-pixel data Dspx, and the ADC 21 may read-out data voltages Vd according to grayscales to generate sensing data Dsen.

In the calibration mode, the timing controller 200 may receive the sensing data Dsen indicating the data voltages Vd according to grayscales from the data driver 100, extract the output property of the DAC 11 based on the sensing data Dsen, and store the extracted output property. In some embodiments, the timing controller 200 may extract the output offsets according to grayscales based on the sensing data Dsen and store the output offsets according to grayscales.

As described above, the data driver 100 may include the plurality of DACs 11, and the timing controller 200 may, in performing the external compensation, determine compensation values based on electrical properties of each of the plurality of sub-pixels and output properties (also referred to as output properties according to channels) of each of the plurality of DACs 11, and compensate the image data based on the determined compensation values. For example, when the sub-pixel data Dspx to be provided to a first sub-pixel represents a 120 grayscale, the timing controller 200 may determine a compensation value based on electrical properties of the first sub-pixel and an offset for the 120 grayscale of the DAC 11 that drives the first sub-pixel (that is, an offset of a data voltage Vd corresponding to the 120 grayscale output from the DAC 11), and compensate the sub-pixel data Dspx by using the determined compensation value. The timing controller 200 may change a data value of the sub-pixel data Dspx based on the determined compensation value.

As described above, in the display system 1, the data driver 100 may use the ADC 21 provided to measure electrical properties of the plurality of sub-pixels to internally measure outputs of the plurality of DACs 11, and in performing the external compensation, the data driver 100 may apply the determined compensation value to the output properties of the plurality of DACs 11. Accordingly, the accuracy of the external compensation may be improved.

Figure 2:
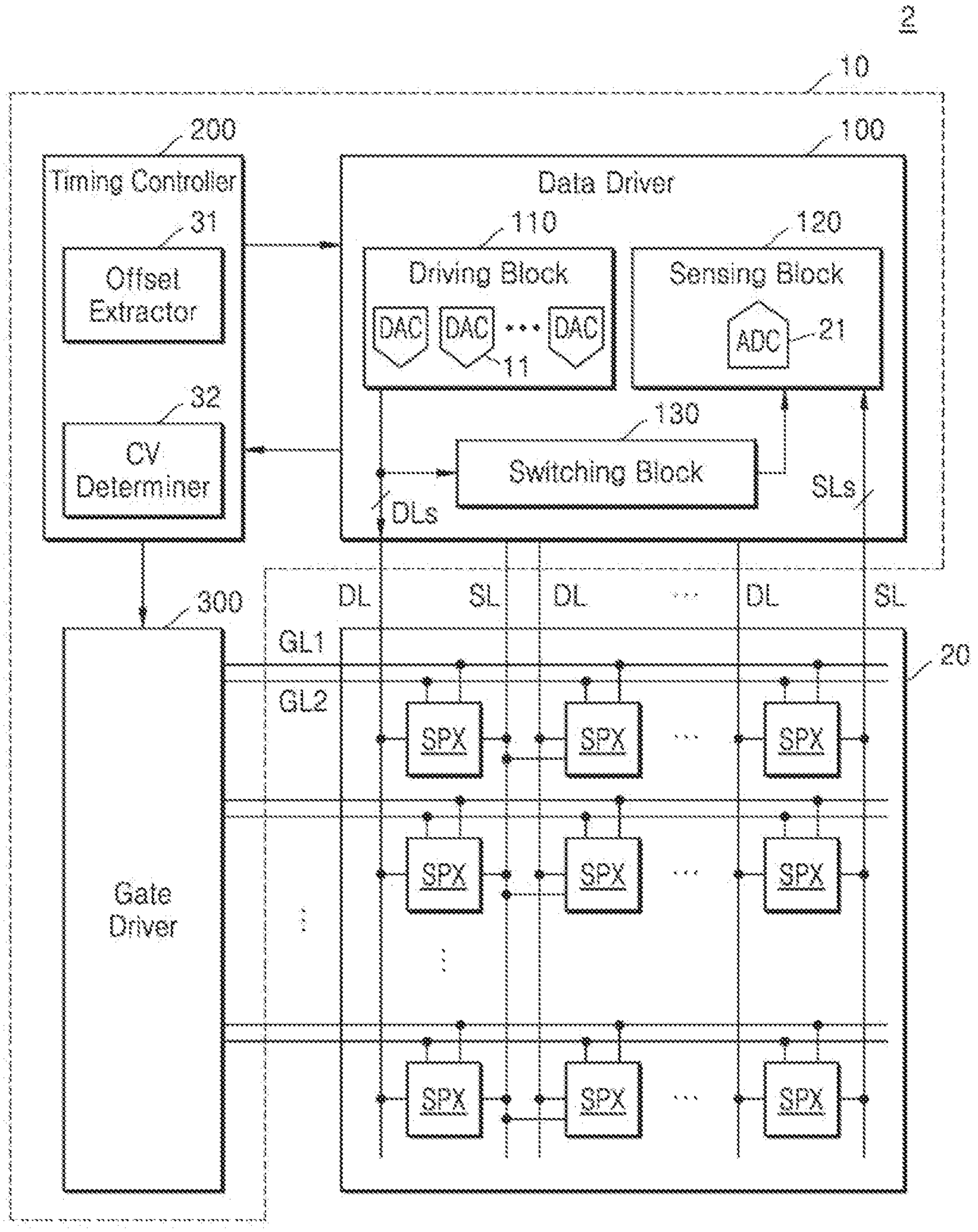
FIG. 2 is a diagram of a display apparatus according to an example embodiment.
Figure 3:
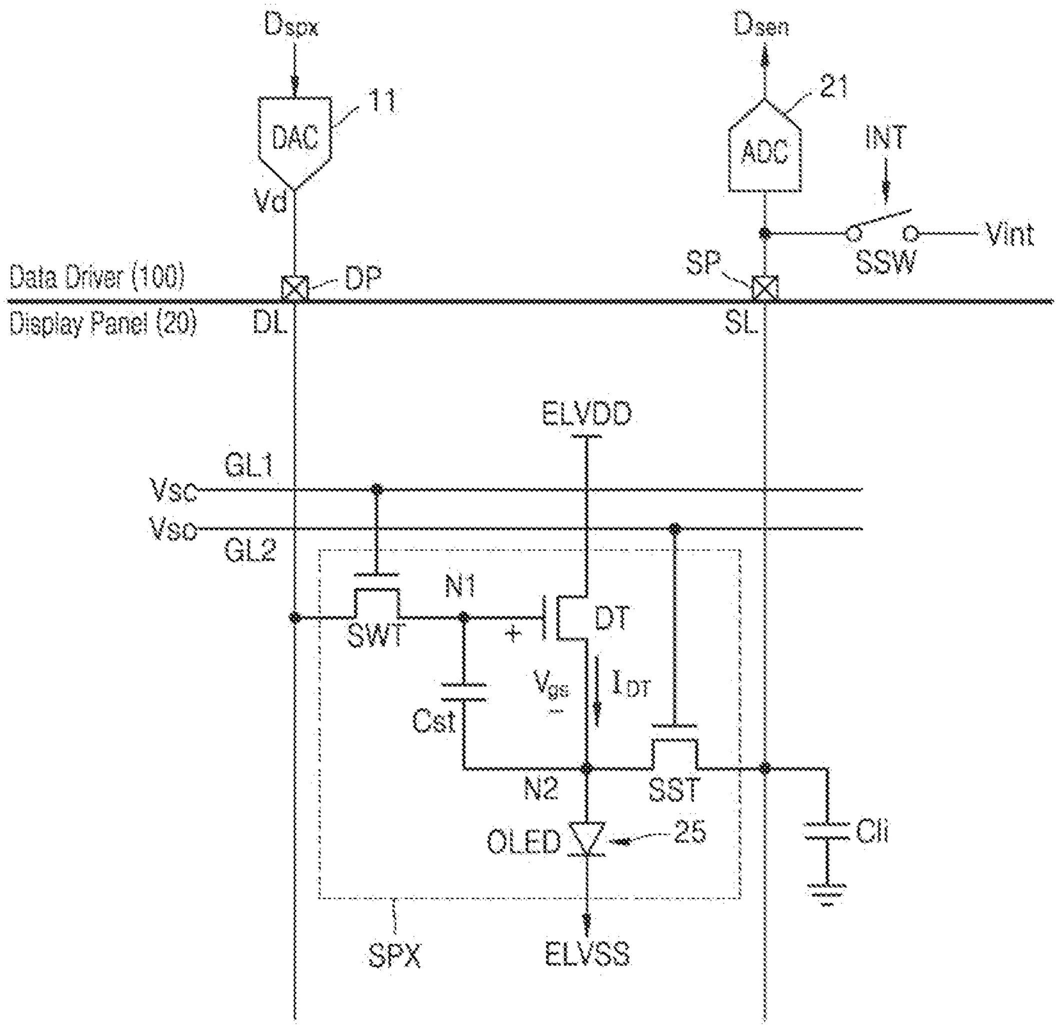
FIG. 3 is an equivalent circuit diagram of a sub-pixel according to an example embodiment.

FIG. 2 is a diagram of a display apparatus according to an example embodiment, and FIG. 3 is an equivalent circuit diagram of a sub-pixel according to an example embodiment.

FIG. 2 more particularly shows the display driving circuit 10 and the display panel 20 of FIG. 1, and descriptions of the display driving circuit 10 and the display panel 20 with reference to FIG. 1 may be applied to the present embodiment.

Referring to FIG. 2, a display apparatus 2 may include the display driving circuit 10 and the display panel 20.

The display panel 20 includes a plurality of signal lines, that is, a plurality of data lines DL, a plurality of sensing lines SL, a plurality of first gate lines GL1, a plurality of second gate lines GL2, and a plurality of sub-pixels SPX connected to the plurality of signal lines. A plurality of adjacent sub-pixels SPX corresponding to a plurality of colors may construct one pixel (a unit pixel).

A sub-pixel SPX may be connected to a data line DL, a sensing line SL, a first gate line GL1, and a second gate line GL2. Sub-pixels SPX arranged in a same row are respectively connected to different data lines DL. In some embodiments, adjacent sub-pixels SPX from among the sub-pixels SPX arranged in a same row may be connected to a same sensing line SL. For example, sub-pixels SPX included in one unit pixel may be connected to a same sensing line SL. However, the embodiment is not limited thereto and the sub-pixels SPX arranged in a same row may be respectively connected to different sensing lines SL.

Referring to FIG. 3, the sub-pixel SPX may include a switching transistor SWT, a driving transistor DT, an OLED 25, a storage capacitor Cst, and a sensing transistor SST. However, a configuration and a structure of the sub-pixel SPX in FIG. 3 are merely examples of a sub-pixel circuit, and a configuration and a structure of the sub-pixel SPX may be variously modified.

A first driving voltage ELVDD and a second driving voltage ELVSS may be applied to the sub-pixel SPX. The first driving voltage ELVDD may be relatively higher than the second driving voltage ELVSS.

The switching transistor SWT, the sensing transistor SST, and the driving transistor DT may include amorphous silicon (a-Si), a thin film transistor (TFT), a polysilicon (poly-Si) TFT, an oxide TFT, an organic TFT, or the like.

The switching transistor SWT may be connected to the first gate line GL1 and the data line DL, turned on in response to a scan voltage Vsc applied through the first gate line GL1, provide a data voltage Vd, which is provided through a data pad DP and the data line DL of the data driver 100, to a gate node N1 of the driving transistor DT.

The sensing transistor SST may be connected to the second gate line GL2 and the sensing line SL and turned on in response to a sensing-on voltage Vso applied through the second gate line GL2. In this case, the sensing switch SSW of the data driver 100 may be turned on in response to an initial signal INT and provide an initialization voltage Vint (or referred to as a reset voltage) to the sub-pixel SPX through the sensing line SL. The sensing transistor SST may provide the initialization voltage Vint, which is provided from the data driver 100, to a source node N2 of the driving transistor DT. In addition, the sensing transistor SST may be turned on in the sensing mode and output a current, which is received from the driving transistor DT or the OLED 25, to the sensing line SL.

The storage capacitor Cst may store a difference between a data voltage Vd applied to the gate node N1 of the driving transistor DT through the switching transistor SWT and the initialization voltage Vint provided to the source node N2 of the driving transistor DT through the sensing transistor SST, thereby providing a constant driving voltage Vgs to the driving transistor DT for a predetermined period, for example, a frame.

The first driving voltage ELVDD is applied to a drain node of the driving transistor DT, and the driving transistor DT may provide a driving current $I_{DT}$, which is proportional to the driving voltage Vgs, to the OLED 25.

The OLED 25 includes an anode connected to the source node N2 of the driving transistor DT, a cathode to which the second driving voltage ELVSS is applied, and an organic emission layer between the cathode and the anode. The cathode may be a common electrode shared by all sub-pixels. The OLED 25 may emit light from the organic emission layer when the driving current $I_{DT}$ is provided from the driving transistor DT. Intensity of the light may be proportional to the driving current $I_{DT}$. The driving current $I_{DT}$ of the driving transistor DT may be represented as Equation 1.

$$I_{DT}=\beta(Vgs-Vth)^2=\beta(Vd-Vint-Vth)^2 \quad \text{[Equation 1]}$$

Here, β denotes a constant value determined by the mobility of the driving transistor DT.

In a sensing mode, electrical properties of the sub-pixel SPX may be measured. The switching transistor SWT may provide a sensing data voltage Vd, which is applied through the data line DL, to the driving transistor DT. As the sensing transistor SST is turned on, a driving current $I_{DT}$ proportional to a difference between voltages of the gate node N1 and the source node N2 of the driving transistor DT, that is, the driving voltage Vgs, may flow through the sensing line SL, and a parasite capacitor of the sensing line SL, that is, a line capacitor Cli, may be charged.

According to various sensing sequences, the ADC 21 may measure a pixel voltage Vps, that is, a voltage of the sensing line SL received through the sensing pad SP at a time point at which a voltage of the source node N2 of the driving transistor DT reaches a saturation state or the voltage of the source node N2 linearly increases. The pixel voltage Vps measured at the time point when the voltage V_N2 of the source node N2 reaches at the saturation state may include information regarding a threshold voltage Vth of the driving transistor DT (hereinafter, the threshold voltage refers to a threshold voltage of the driving transistor DT provided in the sub-pixel), and the pixel voltage Vps measured at the time point when the voltage V_N2 of the source node N2 linearly increases may include the mobility of the driving transistor DT (hereinafter, the mobility refers to the mobility of the driving transistor DT included in the sub-pixel).

Referring to FIG. 2, the display driving circuit 10 may include the data driver 100, the timing controller 200, and a gate driver 300. The data driver 100, the timing controller 200, and the gate driver 300 may be implemented in one integrated circuit (IC). Alternatively, the data driver 100, the timing controller 200, and the gate driver 300 may be respectively formed in different ICs.

The gate driver 300 may use a gate control signal, which is received from the timing controller 200, to drive the plurality of first gate lines GL1 and the plurality of second gate lines GL2 of the display panel 20. In the display mode and the sensing mode, the gate driver provides a pulse of a gate-on voltage, that is, a scan voltage Vsc, to a relevant first gate line GL1 based on the gate control signal in a relevant driving period of each of the plurality of first gate lines GL1, and in other periods, provides a gate-off voltage. In the sensing mode, the gate driver 300 provides a pulse of a gate-on voltage, that is, a sensing-on voltage Vso, to a relevant second gate line GL2 based on the gate control signal in a relevant driving period of each of the plurality of second gate lines GL2, and in other periods, provides a gate-off voltage.

The data driver 100 may include a driving block 110, a sensing block 120, and a switching block 130. The driving block 110 may generate data voltages Vd. In the display mode and the sensing mode, the driving block 110 may convert image data provided from the timing controller 200 or sensing data, which is internally established, to data voltages Vd that are analog signals and output the data voltages Vd to the data lines DLs of the display panel 20. The driving block 110 may include the plurality of DACs 11, and the plurality of DACs 11 may each convert sub-pixel data Dspx (see FIG. 1), which is input, to a data voltage Vd.

In the calibration mode, the driving block 110 may generate data voltages Vd for calibration according to some or all grayscales or according to a previously established representative grayscale and provide the data voltages Vd to the sensing block 120. The driving block 110 may provide data voltages Vd for calibration to the sensing block 120 through the switching block 130.

In the calibration mode, the switching block 130 may provide an output of the driving block 110 to the sensing block 120. In response to a calibration mode signal provided from the timing controller 200, the switching block 130 may provide the output of the driving block 110, that is, the data voltages Vd, to the sensing block 120, according to grayscales based on some or all grayscales or according to a previously established representative grayscale output from each of the plurality of DACs 11. In the sensing mode and the display mode, the switching block 130 may block connection between the driving block 110 and the sensing block 120.

In the sensing mode, the sensing block 120 may measure electrical properties of the plurality of sub-pixels. The sensing block 120 may sense a voltage of each of the sensing lines SLs to which at least some of the plurality of sub-pixels are connected, that is, a pixel voltage Vps. The sensing block 120 may include one or more ADCs 21, and the ADCs 21 may read-out the sensed pixel voltages Vps. In the calibration mode, the sensing block 120 may also measure data voltages Vd received from the switching block 130. The ADC 21 may read-out the sensed data voltages Vd.

The sensing block 120 may provide the read-out pixel voltages Vps or the read-out data voltages Vd as sensing data Dsen (see FIG. 1) to the timing controller 200. In the sensing mode, the sensing data Dsen may include measured values indicating electrical properties of the sub-pixels, that is, information regarding the pixel voltages of the plurality of sub-pixels, and in the calibration mode, the sensing data Dsen may include measured values indicating electrical properties of the driving block 110, that is, information regarding output voltages according to grayscales of each of the plurality of DACs 11.

The timing controller 200 may include an offset extractor 31 and a compensation value (CV) determiner 32. The offset extractor 31 and the compensation value determiner 32 may be realized as software (or firmware), hardware, or a combination of software and hardware.

The offset extractor 31 may extract output properties of the driving block 110 based on sensing data Dsen received in the calibration mode. For example, the offset extractor 31 may extract an offset according to grayscales of each of the plurality of DACs 11 based on the sensing data Dsen. The extracted output properties may be stored in a memory provided in or outside of the timing controller 200.

The compensation value determiner 32 may determine a compensation value, or update a compensation value which is already stored, based on the electrical properties of each of the plurality of sub-pixels and the output properties of the driving block 110. The compensation value determiner 32 may extract the electrical properties such as a threshold voltage or mobility of the plurality of sub-pixels based on the sensing data Dsen received in the sensing mode.

In some embodiments, the compensation value determiner 32 may, when determining a compensation value for compensating for electrical properties of each of the plurality of sub-pixels, determine a compensation value of a relevant sub-pixel considering offsets according to grayscales of the DAC 11 that drives the relevant sub-pixel. Accordingly, a plurality of compensation values, that is, compensation values according to grayscales, may be determined for one sub-pixel. The determined compensation values according to grayscales for each of the plurality of sub-pixels may be stored in a memory, which is provided in or outside of the timing controller 200, and used for compensating for deviation and/or degradation of the sub-pixel data when performing the external compensation.

In some embodiments, the compensation value determiner 32 may determine a compensation value based on the electrical properties of each of the plurality of sub-pixels. When performing data compensation, an offset of the DAC 11 that drives the sub-pixel may be used for data compensation together with the compensation value determined for the sub-pixel.

The output properties of the driving block 110 and the compensation values for sub-pixels may be initially extracted and stored in a manufacturing process of the display apparatus 2. Later, the output properties of the driving block 110 and the compensation values for sub-pixels may be updated as the data driver 100 performs a calibration operation and/or a sub-pixel sensing operation in a dummy section (or a vertical blanking section) between a booting section after power-on, an end section at power-off, and/or frame display sections of the display panel 20.

In some embodiments, the timing controller 200 may perform data compensation. However, the timing controller 200 is not limited thereto, and in other embodiments, the timing controller 200 may transmit the output properties of the driving block 110 and/or the compensation value for each of the plurality of sub-pixels to the host processor 30 (see FIG. 1), the host processor 30 may generate image data based on the output properties of the driving block 110 and/or the compensation values for the plurality of sub-pixels or perform data compensation for the generated image data and provide the compensated image data to the timing controller 200.

Figure 4:
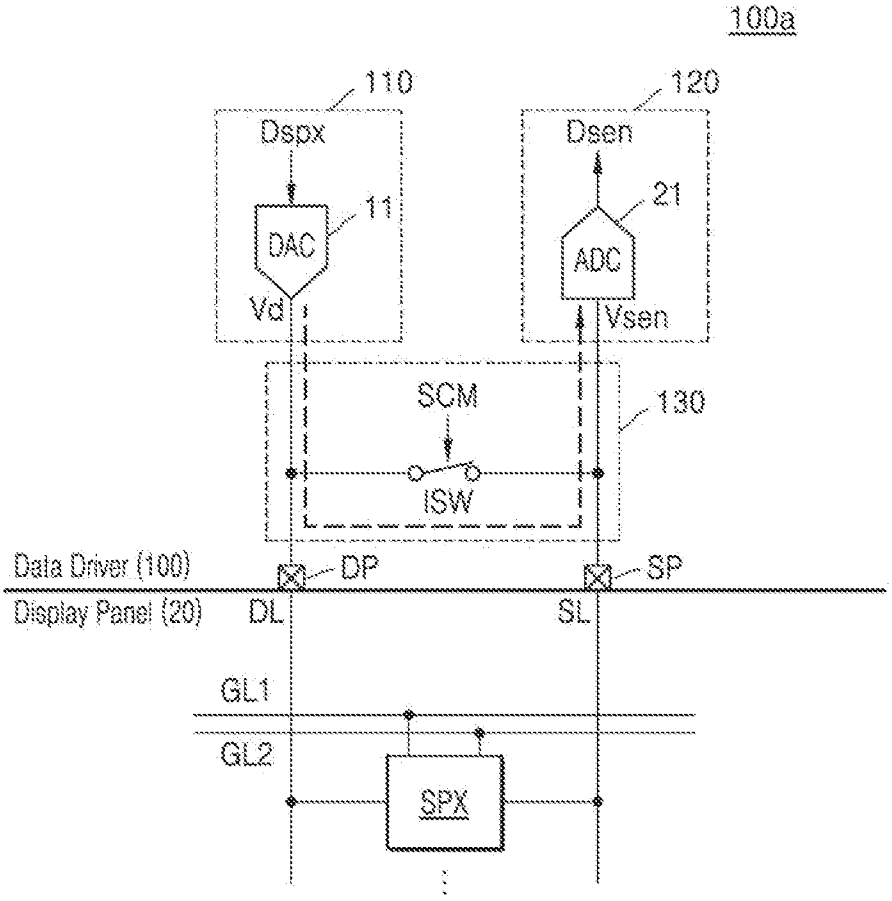
FIG. 4 shows a calibration operation of a data driver of the display apparatus shown in FIG. 2, according to an example embodiment.

FIG. 4 shows a calibration operation of the data driver of the display apparatus of FIG. 2, according to an embodiment.

Referring to FIG. 4, the driving block 110 may include the DAC 11 and the sensing block 120 may include the ADC 21. The switching block 130 may include an internal connection switch ISW (referred to as a first switch hereinafter) that electrically connects the driving block 110 to the sensing block 120 in the calibration mode.

In the calibration mode, the first switch ISW may be turned on in response to a calibration mode signal SCM to provide the data voltage Vd, which is output from the DAC 11, to the sensing block 120. The ADC 21 may read-out the data voltage Vd. In the calibration mode, the DAC 11 may output data voltages Vd according to grayscales, and the sensing block 120 may read-out the data voltages Vd according to grayscales of the DAC 11. The data voltages read-out in the calibration mode are provided to the timing controller 200 (see FIGS. 1 and 2) as sensing data Dsen. In the sensing mode and the display mode, the first switch ISW may be turned off to block/prevent the data voltage Vd from being provided to the sensing block 120.

As described above, in the data driver 100 according to an example embodiment, in the calibration mode, the sensing block 120 and the driving block 110 are internally connected through the switching block 130, thereby, the sensing block 120 may internally read-out output voltages of the driving block 110 without using the data pad DP and the sensing pad SP.

Figure 5A:
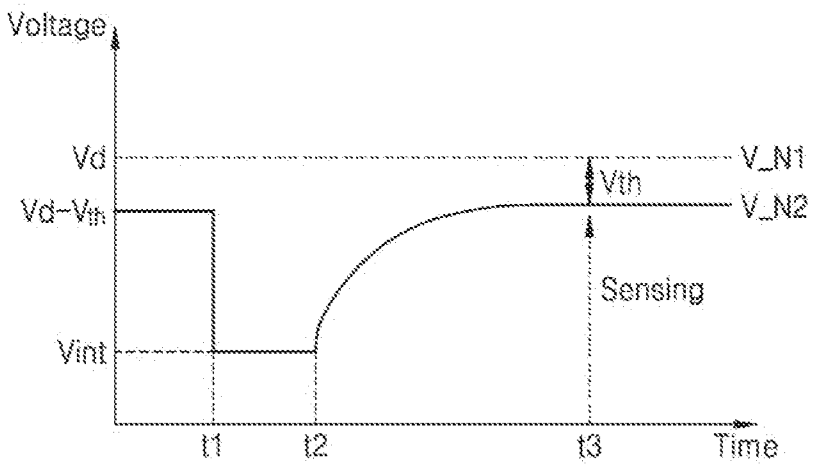
FIGS. 5A and 5B are each a graph showing a method of measuring electrical properties of a sub-pixel, according to an example embodiment.
Figure 5B:
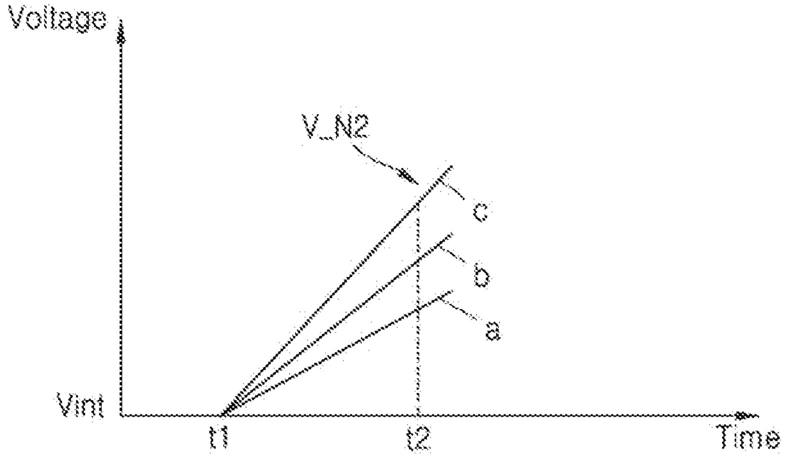

FIGS. 5A and 5B are graphs each showing a method of measuring the electrical properties of the sub-pixels, according to example embodiments. FIG. 5A shows a method of measuring the threshold voltage of the sub-pixel, and FIG. 5B shows a method of measuring mobility of the sub-pixel.

Referring to FIGS. 3 and 5A, in a first sensing mode, the switching transistor SWT may be turned on and provide the data voltage Vd for sensing, which is provided from the DAC 11, to a gate node N1 of the driving transistor DT.

Before the sensing transistor SST is turned on, that is, before a time point T1, a voltage V_N2 of the source node N2 of the driving transistor DT has a value (for example, Vd-Vth) that decreased by the threshold voltage Vth from a voltage V N1 of the gate node N1.

Next, as the sensing transistor SST and the sensing switch SSW of the data driver 100 are turned on at the time point T1, the voltage V_N2 of the source node N2 decreases to the initialization voltage Vint. At this time, the OLED 25 does not emit light in response to the initialization voltage Vint that is provided to the source node N2 through the sensing transistor SST.

The sensing switch SSW is turned on at a time point t2, and the switching transistor SWT and the sensing transistor SST may remain in a turn-on state. The current $I_{DT}$ flows through the driving transistor DT in response to a voltage stored in the storage capacitor Cst, that is, the driving voltage Vgs, and the current $I_{DT}$ may charge a parasite capacitor of the sensing line SL, that is, a line capacitor Cli. As the line capacitor Cli is charged, a voltage V_N2 of the source node N2 of the driving transistor DT may increase. At this time, as the driving voltage Vgs applied to the driving transistor DT decreases, the current $I_{DT}$ also decreases.

When the driving voltage Vgs reaches a threshold voltage Vth of the driving transistor DT, a current does not flow through the driving transistor DT and a voltage V_N2 of the source node N2 is maintained constant. The voltage V_N2 of the source node N2 may increase to a value decreased by the threshold voltage Vth from the voltage V N1 of the gate node N1 (that is, Vd–Vth). After the voltage V_N2 of the source node N2 is saturated, at a time point t3, the ADC 21 may sense the voltage of the sensing line SL, that is, the pixel voltage Vps, to read-out the pixel voltage Vps. The threshold voltage Vth of the driving transistor DT may be extracted based on the pixel voltage Vps. For example, when a data voltage Vd is 5 V and the pixel voltage Vps is extracted as 4.4 V, the threshold voltage Vth may be 0.6 V. When the pixel voltage Vps is extracted as 4.3 V, the threshold voltage Vth may be 0.7 V.

When threshold voltage compensation is performed based on the extracted threshold voltage Vth, the data voltage Vd output from the DAC 11 is adjusted as Vd+Vth. Accordingly, the current $I_{DT}$ of the driving transistor DT may be represented as Equation 2 based on Equation 1 and the adjusted data voltage Vd.

$$I_{DT}=\beta((Vd+Vth)-Vint-Vth)^2=\beta(Vd-Vint)^2 \quad \text{[Equation 2]}$$

According to Equation 2, as the threshold voltage Vth is eliminated from factors determining the current $I_{DT}$ of the driving transistor DT, the current $I_{DT}$ of the driving transistor DT has a constant value even when the threshold voltage Vth changes. Accordingly, degradation in quality of image according to changes of the threshold voltage Vth may be prevented.

Referring to FIGS. 3 and 5B, in a second sensing mode, the switching transistor SWT may be turned on to provide the data voltage Vd for sensing, which is provided from the DAC 11, to the gate node N1 of the driving transistor DT. In addition, as the sensing switch transistor SST and the sensing switch SSW of the data driver 100 are turned on, the initialization voltage Vint may be applied to the source node N2. Accordingly, the driving voltage Vgs applied to the driving transistor DT is Vd-Vint. Next, as the switching transistor SWT and the sensing switch SSW are turned off at the time point t1 and the current $I_{DT}$, which is constant, flows through the driving transistor DT, the voltage V_N2 of the source node N2 of the driving transistor DT linearly increases. At a time point when the voltage V_N2 of the source node N2 linearly increases, that is, at the time point T2, the ADC 21 may sense the voltage of the sensing line SL, that is, the pixel voltage Vps, to read-out the pixel voltage Vps. The mobility of the driving transistor DT may be extracted based on the pixel voltage Vps that is read-out. As the mobility increases, a voltage level of the read-out pixel voltage Vps may increase. Accordingly, from among graphs a, b, and c shown in FIG. 5B, graph c may have highest mobility and graph a may have lowest mobility.

When mobility compensation is performed based on the extracted mobility, the data voltage Vd output from the DAC may be adjusted as Vd+ΔVm. ΔVm denotes a voltage for compensating for changes in the mobility. When the threshold voltage compensation and mobility compensation are performed, the current $I_{DT}$ of the driving transistor DT may be represented as Equation 3. A voltage increase ΔVm may have a property like when the mobility is adjusted.

$$I_{DT} = \beta((Vd + Vth + \Delta Vm) - Vint - Vth)^2 = \beta'((Vd + Vth) - Vint - Vth)^2 = \beta'(Vd - Vint)^2 \quad \text{[Equation 3]}$$

Here, β' denotes a constant value determined by the compensated mobility of the driving transistor DT.

Figure 6:
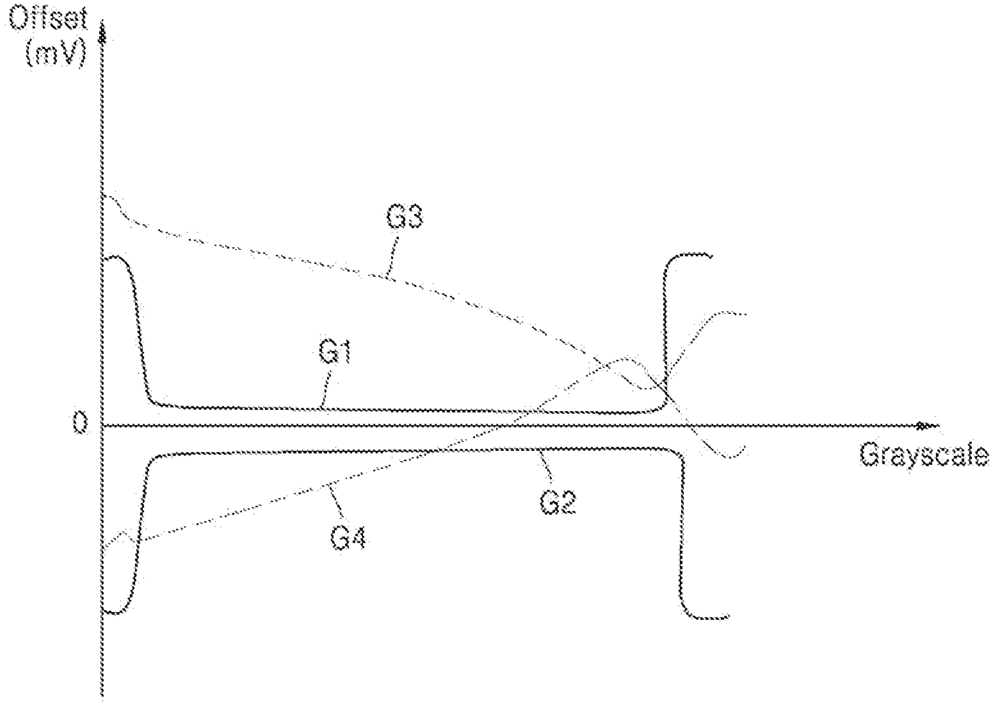
FIG. 6 is a graph showing offsets according to grayscales of digital-analog converter (DAC) outputs, according to an example embodiment.

FIG. 6 is a graph showing offsets according to grayscales of the output from the DAC 11 in FIG. 1, according to an example embodiment.

Referring to FIG. 6, as shown in a graph G1 and a graph G2, the offset of the output of the DAC 11 may be higher in a low grayscale or a high grayscale than in an intermediate grayscale. Alternatively, according to a process of manufacturing the data driver 100, the offset of the output of the DAC 11 may change according to grayscales as shown in a graph G3 and a graph G4. However, the offset may be rapidly changed in the low grayscale or high grayscale in the graph G3 and G4.

As such, offsets of the outputs of the plurality of DACs 11 may be different from one another, and a single DAC 11 may have an offset that changes according to grayscales. That is, a first DAC of the plurality of DACs 11 may have a first offset for a first grayscale value, and a second DAC of the plurality of DACs 11 may have a second offset for the first grayscale value, where the second offset is different from the first offset. In the related art, even when data compensation is performed for the electrical properties of the above-described sub-pixels, the accuracy of the data compensation may decrease due to output deviation, that is, offsets of the DACs 11.

As described above, the display system 1 (see FIG. 1) and the display apparatus 2 (see FIG. 2) according to an example embodiment may measure an output voltage for grayscales of each of the plurality of DACs 11 in the driving block 110, that is, offsets according to grayscales of the plurality of DACs 11 based on measured values, perform accurate data compensation by using the electrical properties of the plurality of sub-pixels SPX in the display panel 20 and the output properties of the driving block 110. By doing so, complexity of a compensation algorithm for accurate data compensation and iteration of a data compensation operation may be reduced. In addition, as compensation is performed for the output properties of the driving block 110, that is, as compensation is performed for the offsets of the plurality of DACs 11, a circuit for reduction of the offsets is not required. Accordingly, a size of the data driver 100, that is, a size of a data driving IC, may be reduced.

Figure 7A:
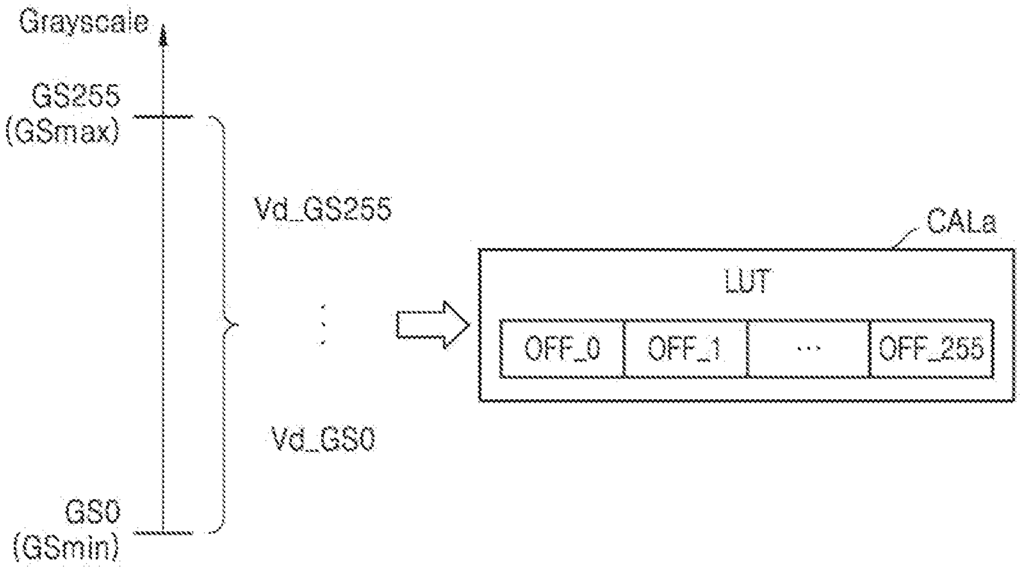
FIGS. 7A through 7C show a method of measuring outputs according to grayscales of a DAC and a method of storing the offsets according to grayscales based on the measured outputs according to grayscales, according to example embodiments.
Figure 7B:
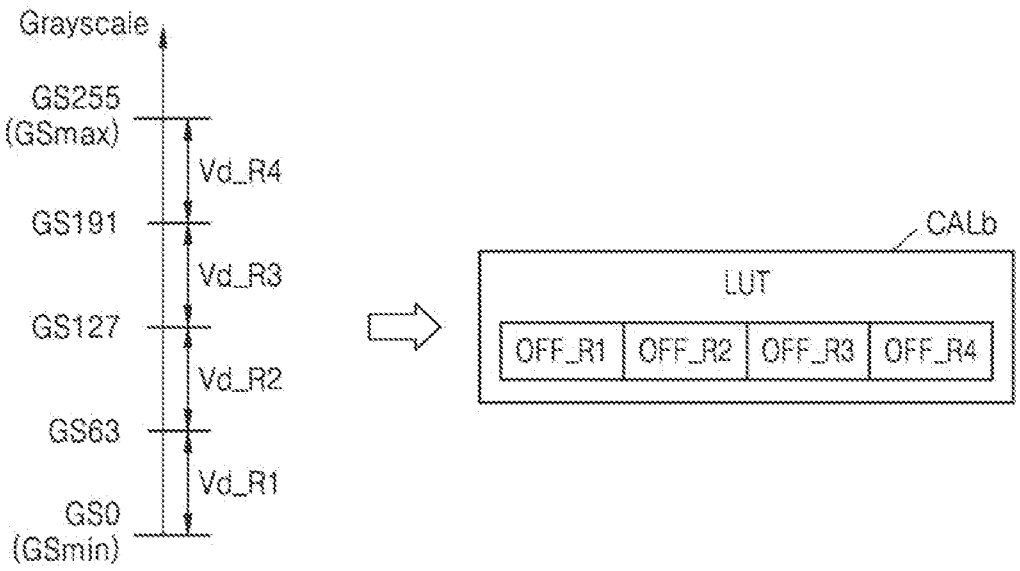
Figure 7C:
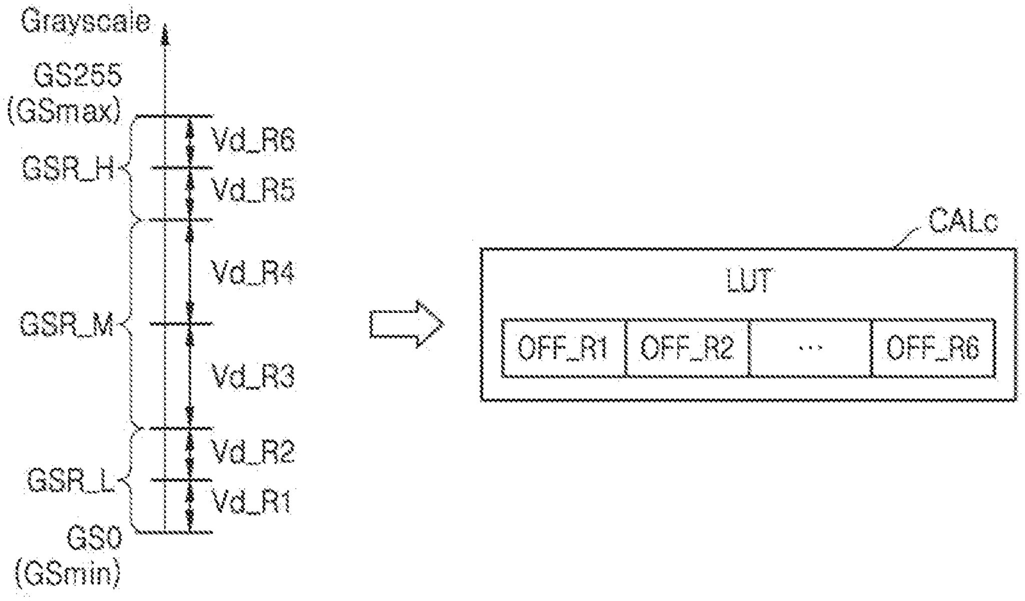

FIGS. 7A through 7C show a method of measuring outputs according to grayscales of the DAC 11 and a method of storing the offsets according to grayscales based on the measured output according to grayscales, according to various example embodiments.

Referring to FIG. 7A, in the calibration mode, the DAC 11 may output grayscale voltages Vd_GS0 through Vd_GS255 for all grayscales, for example, from a first grayscale GS0 that is a minimum grayscale GSmin to a two hundred and fifty sixth grayscale GS255 that is a maximum grayscale Gsmax, that is, data voltages for all grayscales, and the ADC 21 may read-out the grayscale voltages Vd_GS0 through Vd_GS255. The timing controller 200 may extract offsets OFF_0 through OFF_255 for all grayscales based on the read grayscale voltages Vd_GS0 through Vd_GS255 and store the extracted offsets as calibration data CALa. In the embodiment shown in FIG. 7A, the timing controller 200 (see FIG. 2) may store the offsets OFF_0 through OFF_255 as a lookup table (LUT) for all the grayscales for each of the plurality of DACs 11, that is, each of all the channels.

Referring to FIG. 7B, all grayscales are classified into a plurality of grayscale groups, and in the calibration mode, the DAC 11 may output grayscale voltages for a representative grayscale of each of the plurality of grayscale groups. For example, as shown in the example of FIG. 7B, four grayscale groups may be determined by grouping two hundred and fifty six grayscales into four groups of sixty four grayscales, the grayscale voltages for one representative grayscale for each grayscale group may be output. For example, the representative grayscale may be an intermediate grayscale of each grayscale group. The ADC 21 may read representative grayscale voltages Vd_R1 through Vd_R4.

The timing controller 200 may extract first through fourth offsets OFF_R1 through OFF_R4 corresponding to each grayscale group based on the read-out representative grayscale voltages Vd_R1 through Vd_R4 and store the extracted offsets as calibration data CALb. When sub-pixel data included in the received image data indicates a 160 grayscale, the timing controller 200 may perform data compensation for deviation and/or degradation of the sub-pixel data based on the electrical properties (a threshold voltage and/or mobility) of a sub-pixel to which the sub-pixel data is provided and a third offset OFF_R3 indicating for the 160 grayscale of the ADC 21 that drives the sub-pixel.

Referring to FIG. 7C, all the grayscales are classified into a plurality of grayscale groups, and the DAC 11 may output grayscale voltages for the representative grayscale of each of the plurality of grayscale groups. Unlike in FIG. 7B, the plurality of grayscale groups may have different ranges. For example, a low grayscale region GSR_L and a high grayscale region GSR_H may be classified with higher density than that of an intermediate grayscale region GSR_M, and accordingly, a grayscale range of each of grayscale groups in the low grayscale region GSR_L and the high grayscale region GSR_H may be smaller than a grayscale range of each grayscale group in the intermediate grayscale region GSR_M.

As described with reference to FIG. 6, as the offsets rapidly change in the low grayscale region GSR_L or the high grayscale region GSR_H, a greater number of grayscale voltages may be measured in the low grayscale region GSR_L and the high grayscale region GSR_H than in the intermediate grayscale region GSR_M and used in data compensation, and thus, change properties of the offsets may be more accurately applied.

Figure 8:
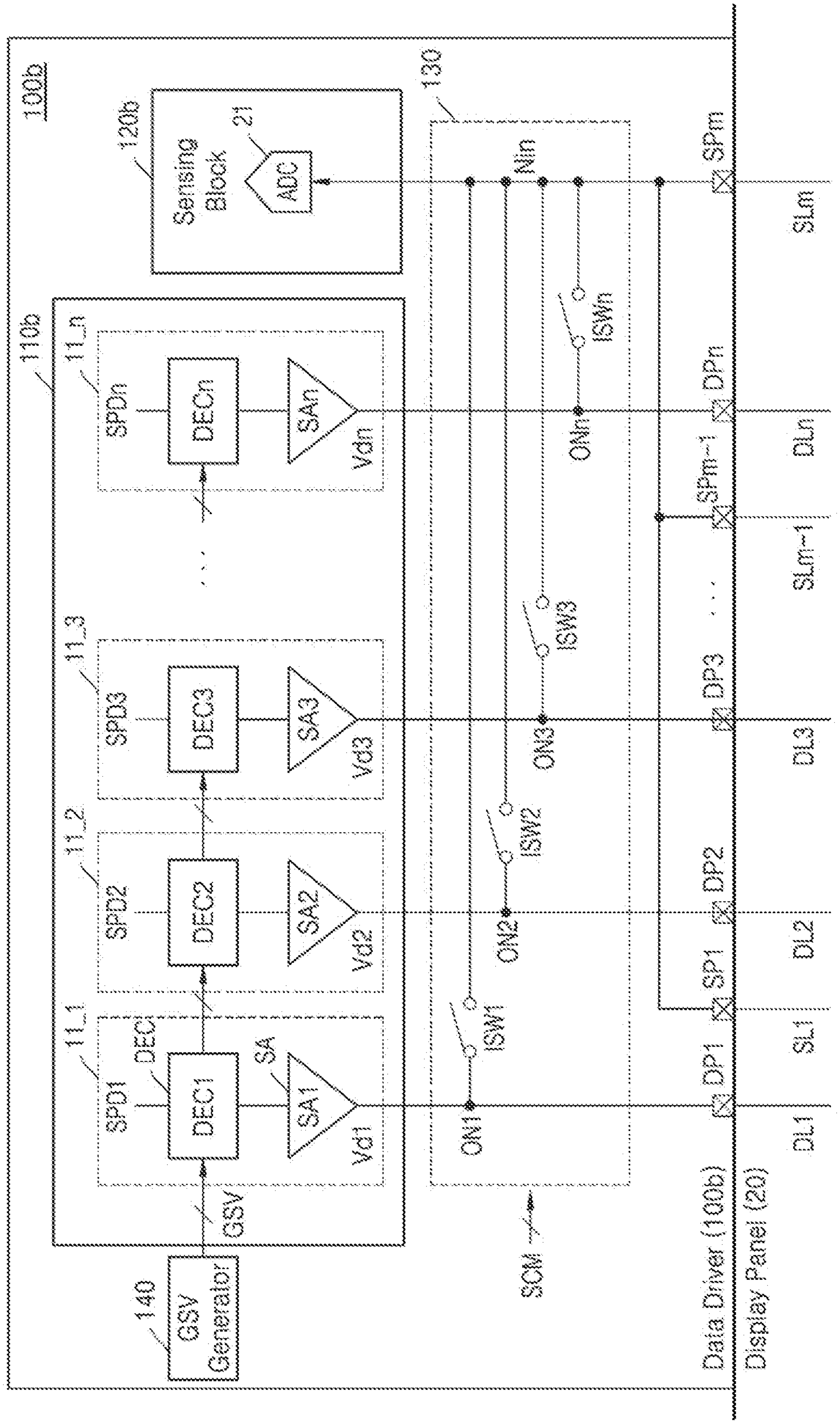
FIG. 8 is a circuit diagram of a data driver according to an example embodiment.

FIG. 8 is a circuit diagram of a data driver according to an example embodiment.

Referring to FIG. 8, a data driver 100*b* may include a driving block 110*b*, a sensing block 120*b*, the switching block 130, and a grayscale voltage generator 140. The data driver 100*b* may be realized as one or more data driving ICs and include a plurality of data pads DP1 through DPn and a plurality of sensing pads SP1 through SPm (n is a positive integer, and m is a positive integer smaller than or equal to n). The plurality of data pads DP1 through DPn may be electrically connected to the plurality of data lines DL1 through DLn of the display panel 20, and the plurality of sensing pads SP1 through SPn may be electrically connected to the plurality of sensing lines SL1 through SLn of the display panel 20.

The driving block 110*b* may include first DAC 11_1 through $n^{th}$ DAC 11_*n*, and the first through $n^{th}$ DACs 11_1 through 11_*n* may each include decoders DEC1 through DECn and source amplifiers SA1 through SAn (may also be referred to as a channel amplifier or a channel buffer), respectively. The first through $n^{th}$ DACs 11_1 through 11_*n* may each convert the received pieces of sub-pixel data SPD1 through SPDn into analog signals, that is, first through $n^{th}$ data voltages Vd1 through Vdn. Each decoder DEC may receive a plurality of grayscale voltages GSV from the grayscale voltage generator 140, select one of the plurality of grayscale voltages GSV based on the sub-pixel data, and output the selected grayscale voltage. Each source amplifier SA may buffer and output the selected grayscale voltage. For example, the grayscale voltage generator 140 may generate two hundred and fifty six (256) grayscale voltages GSV, that is, grayscale voltages GSV for 256 grayscales, and provide the grayscale voltages GSVs to the decoder DEC included in each of the first through $n^{th}$ DACs 11_1 through 11_*n*. First sub-pixel data may include eight bits, and the decoder DEC may select a grayscale voltage GSV, which corresponds to a data value of the sub-pixel data, from among the 256 grayscale voltages GSVs and output the selected grayscale voltage GSV. When the first through $n^{th}$ pieces of sub-pixel data SPD1 through SPDn are identical, the first through $n^{th}$ data voltages Vd1 through Vdn output from the first through $n^{th}$ DACs 11_1 through 11_*n* may be ideally identical to one another. However, as described above, the first through $n^{th}$ data voltages Vd1 through Vdn may be different from one another due to output offsets of the first through $n^{th}$ DACs 11_1 through 11_*n*.

The switching block 130 may include a plurality of first switches ISW1 through ISWn, and in the calibration mode, the plurality of first switches ISW1 through ISWn may be turned on in response to a calibration signal SCM and provide outputs of the first through $n^{th}$ DACs 11_1 through 11_*n*, that is, the first through $n^{th}$ data voltages Vd1 through Vdn, to the sensing block 120*b*. The plurality of first switches ISW1 through ISWn may be connected between output nodes ON1 through ONn of the first through $n^{th}$ DACs 11_1 through 11_*n* and an input node Nin of the sensing block 120*b*. The ADC 21 of the sensing block 120*b* may sequentially read the outputs of the first through $n^{th}$ DACs 11_1 through 11_*n*. Accordingly, the plurality of first switches ISW1 through ISWn may be sequentially turned on. For example, the calibration signal SCM may include first through $n^{th}$ pulse signals respectively transited to a switch-on level at different time points, and the plurality of first switches ISW1 through ISWn may be turned on in response to corresponding pulse signals from among the first through $n^{th}$ pulse signals. Therefore, the plurality of first switches ISW1 through ISWn may be sequentially turned on and the first through $n^{th}$ data voltages VD1 through VDn of the first through $n^{th}$ DACs 11_1 through 11_*n* may be sequentially provided to the sensing block 120*b*.

In the embodiment shown in FIG. 8, the switching block 130 may further include a plurality of output switches respectively connected between the output nodes ON1 through ONn of the first through $n^{th}$ DACs 11_1 through 11_*n* and the first through $n^{th}$ data pads DP1 through DPn. The output switches may be turned on in the display mode or the sensing mode and provide the first through $n^{th}$ data voltages Vd1 through Vdn of the first through $n^{th}$ DACs 11_1 through 11_*n* to the plurality of data lines DL1 through DLn of the display panel. In the calibration mode, the output switches may be turned off.

Figure 9:
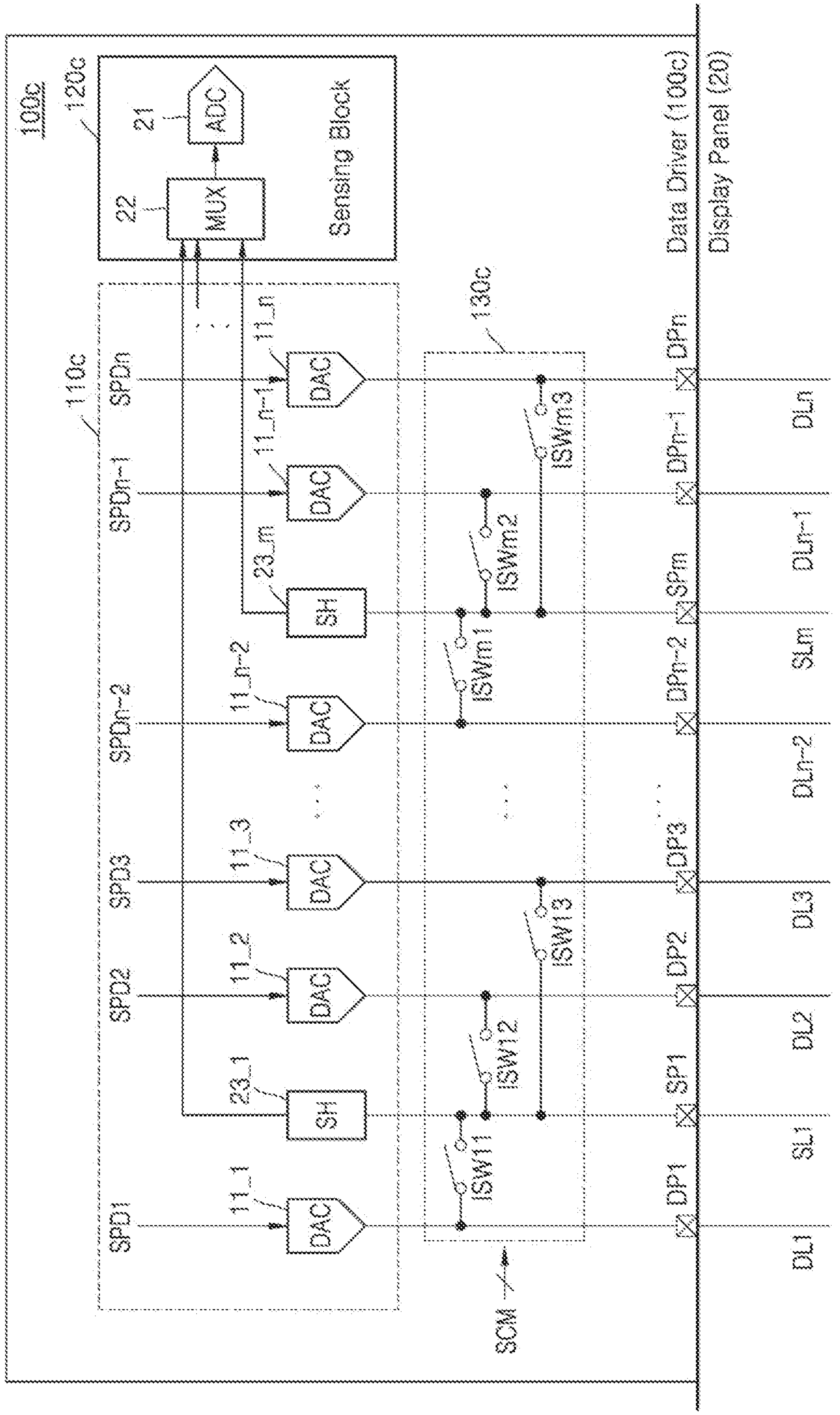
FIG. 9 is a circuit diagram of a data driver according to an example embodiment.

FIG. 9 is a circuit diagram of a data driver according to an example embodiment.

Referring to FIG. 9, a data driver 100*c* may include a driving block 110*c*, a sensing block 120*c*, and a switching block 130*c*. The data driver 100*c* may further include other unshown configurations, for example, a grayscale voltage generator.

In FIG. 9, the driving block 110*c* may include the first through $n^{th}$ DACs 11_1 through 11_*n*, and the sensing block 120*c* may include the ADC 21, a multiplexer 22, and a plurality of sampling/hold circuits 23_1 through 23_*m*. The plurality of sampling/hold circuits 23_1 through 23_*m* may be respectively connected to the plurality of sensing lines SL1 through SLm of the display panel 20 through a plurality of sensing pads SP1 through SPm.

In the sensing mode, the plurality of sampling/hold circuits 23_1 through 23_*m* may perform sampling with respect to voltages of the plurality of sensing lines SL1 through SLm, that is, the pixel voltages, and maintain the sampled values. The pixel voltages sampled by the plurality of sampling/hold circuits 23_1 through 23_*m* may be sequentially selected by the multiplexer 22 and provided to the ADC 21.

The switching block 130*c* may include a plurality of first switches ISW11 through ISWm3. The plurality of first switches ISW11 through ISWm3 may be connected to the first through nth DACs 11_1 through 11_*n* and the plurality of sampling/hold circuits 23_1 through 23_*m*. In the calibration mode, the plurality of switches ISW11 through ISWm3 may be turned on in response to the calibration signal SCM and provide outputs of the plurality of DACs 11_1 through 11_*n*, that is, data voltages, to the plurality of sampling/hold circuits 23_1 through 23_*m*. As the switches connected to the same sampling/hold circuits are sequentially turned on, simultaneous application of a plurality of voltages to the sampling/hold circuits (23_1 through 23_*m*) may be prevented. For example, first switches ISW11, ISW12, and ISW13 may be connected to a first sampling/hold circuit 23_1, and when the first switch ISW11 is turned on to provide an output of a first DAC 11_1 to the first sampling/hold circuit 23_1 and the output of the first DAC 11_1 sampled by the first sampling/hold circuit 23_1 is transmitted to the ADC 21 through the multiplexer 22, the first switch ISW12 may be turned on to provide an output of a second DAC 11_2 to the first sampling/hold circuit 23_1. As described above, the outputs of the plurality of DACs 11_1 through 11_*n* may be sequentially read-out from the ADC 21.

In some embodiments, the switching block 130*c* may further include a plurality of input switches connected between the plurality of sampling/hold circuits 23_1 through 23__m_ and the plurality of sensing pads SP1 through SPm. The plurality of input switches may be turned on in the sensing mode and provide voltages of the plurality of sensing lines SL1 through SLm, that is, the pixel voltages, to the plurality of sampling/hold circuits 23_1 through 23__m_. In the calibration mode, the input switches may be turned off.

Figure 10:
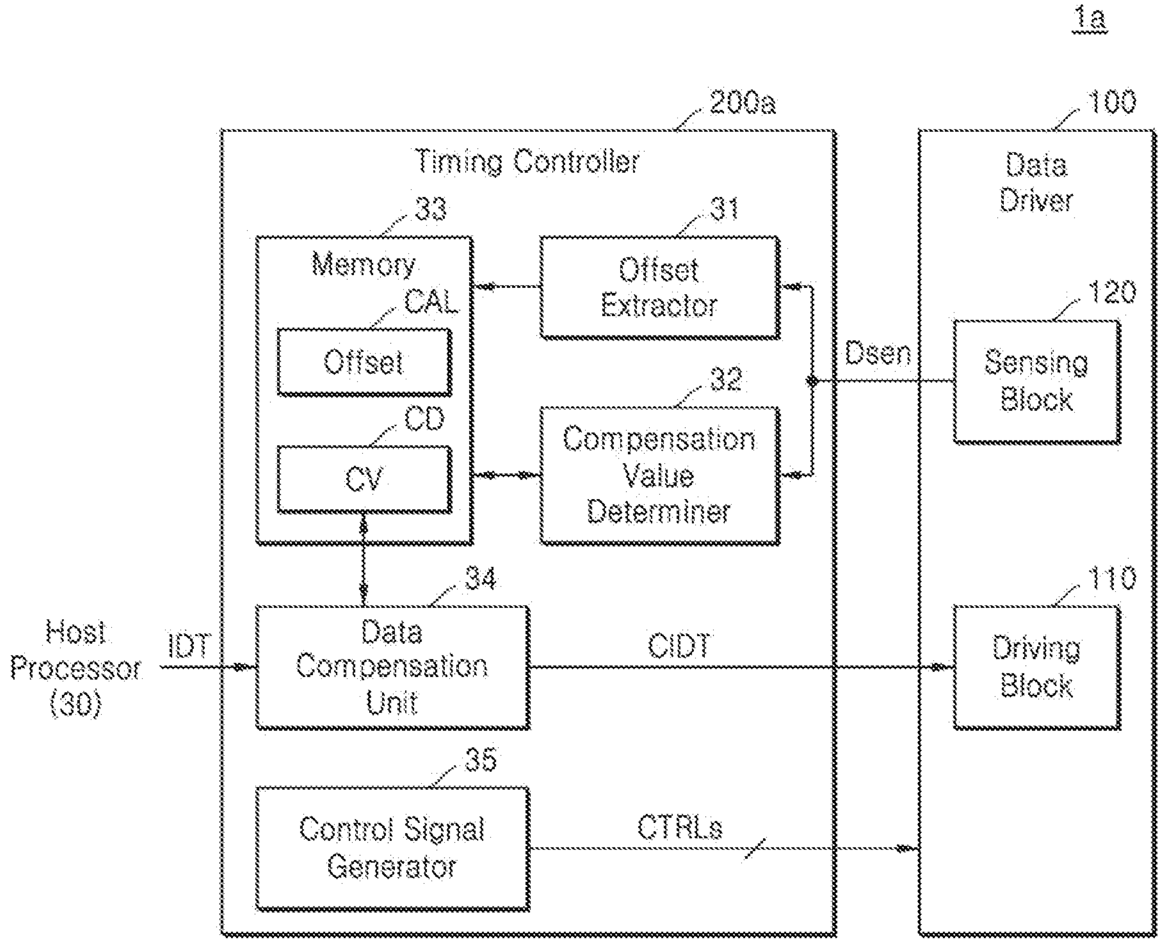
FIG. 10 is a diagram of a display system including a timing controller and a data driver according to an example embodiment.

FIG. 10 is a diagram of a timing controller according to an example embodiment.

Referring to FIG. 10, a timing controller 200_a_ may include the offset extractor 31, the compensation value determiner 32, a memory 33, a data compensation unit 34, and a control signal generator 35. The timing controller 200_a_ may further include other unshown configurations. The configurations (for example, the offset extractor 31, the compensation value determiner 32, the memory 33, the data compensation unit 34, and the control signal generator 35) of the timing controller 200_a_ may be realized as software (or firmware), hardware, or a combination of software and hardware.

The offset extractor 31 may extract output properties of the driving block 110, for example, the offsets according to grayscales of the plurality of DACs, based on the sensing data Dsen received in the calibration mode. The extracted output property may be stored in the memory 33 as calibration data CAL.

The compensation value determiner 32 may determine a compensation value or update the compensation value that is already stored. The compensation value determiner 32 may extract electrical properties of the plurality of sub-pixels, for example, the threshold voltage or mobility of the driving transistor, based on the sensing data Dsen received in the sensing mode. The compensation value determiner 32 may determine a compensation value based on the electrical properties of the plurality of sub-pixels. In the embodiment shown in FIG. 10, the compensation value determiner 32 may access the calibration data CAL stored in the memory 33 and determine the compensation value based on the calibration data CAL and the electrical properties of the plurality of sub-pixels. The determined compensation value may be stored in the memory 33 as compensation data CD.

The data compensation unit 34 may perform data compensation for deviation and/or degradation of image data $I_{DT}$ received from the host processor 30. The image data $I_{DT}$ may include sub-pixel data corresponding to each of the sub-pixels, and the data compensation unit 34 may compensate the sub-pixel data based on the compensation data DA and the calibration data CAL stored in the memory 33. In the embodiment shown in FIG. 10, when the compensation value of the compensation data CD is a value to which the electrical properties of the sub-pixel and the driving block 110 are applied, the data compensation unit 34 may compensate the sub-pixel data based on the compensation data CD stored in the memory 33. The data compensation unit 34 may provide compensated image data CDIT to the data driver 100.

The control signal generator 35 may use a timing signal received from the host processor 30 to generate data control signals CTRLs for controlling driving timing of the data driver 100 and output the data control signals CTRLs to the data driver 100. In addition, the control signal generator 35 may generate gate control signals for controlling driving timing of the gate driver 300 and output the gate control signals to the gate driver 300. For example, the control signal generator 35 may, from the host processor 30, receive a plurality of timing signals such as a clock signal, a data enabling signal, a horizontal synchronizing signal, a vertical synchronizing signal, and generate, based on the plurality of received timing signals, a calibration mode signal SCM provided to the switching block 130. The control signal generator 35 may further generate various control signals.

Figure 11:
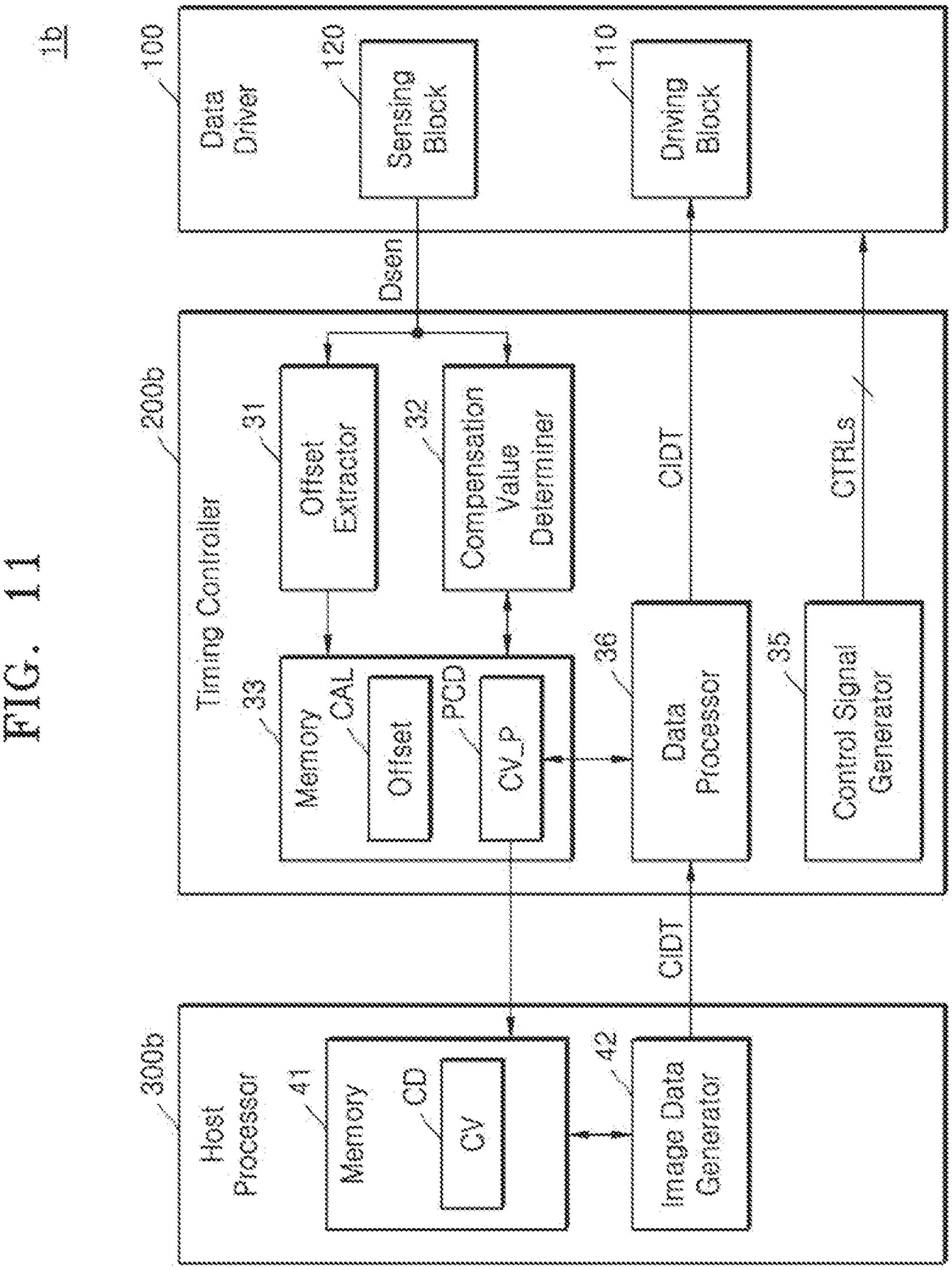
FIG. 11 is a diagram of a display system including a timing controller and a data driver according to an example embodiment.

FIG. 11 is a block diagram of a display system according to an example embodiment.

Referring to FIG. 11, a display system 1_b_ may include a host processor 300_b_, a timing controller 200_b_, and the data driver 100.

In the embodiment shown in FIG. 11, the host processor 300_b_ may perform data compensation. The compensation value determiner 32 of the timing controller 200_b_ may determine the compensation values of the sub-pixels based on the electrical properties of the sub-pixels and the calibration data CAL. In the sensing mode, the compensation value determiner 32 may determine compensation values of some sub-pixels (referred to as partial compensation values) from among the plurality of sub-pixels. The determined partial compensation value CV_P may be temporarily stored in the memory 33 and then transmitted to the host processor 300_b_.

The host processor 300_b_ may include a memory 41 and an image data generator 42. In some embodiments, the memory 41 may be provided outside of the host processor 300_b_. The memory 41 may store the compensation data CD. When partial compensation data PCD indicating the compensation values of partial sub-pixels are received from the timing controller 200_b_, partial compensation values from among the compensation data CD may be updated based on the received partial compensation data PCD.

The image data generator 42 may generate image data based on the compensation data CD or perform data compensation for the generated image data, thereby generating compensated image data CIDT.

The timing controller 200_b_ may receive the compensated image data CIDT and provide the compensated image data CIDT to the data driver 100 after performing image processing with respect to the compensated image data CIDT or without performing image processing. That is, the timing controller 200_b_ may include the data processor 36, and the data processor 36 may perform image processing on the compensated image data CIDT. For example, the data processor 36 may change a data format or perform image processing for reduction of power consumption with respect to the compensated image data CIDT.

Figure 12:
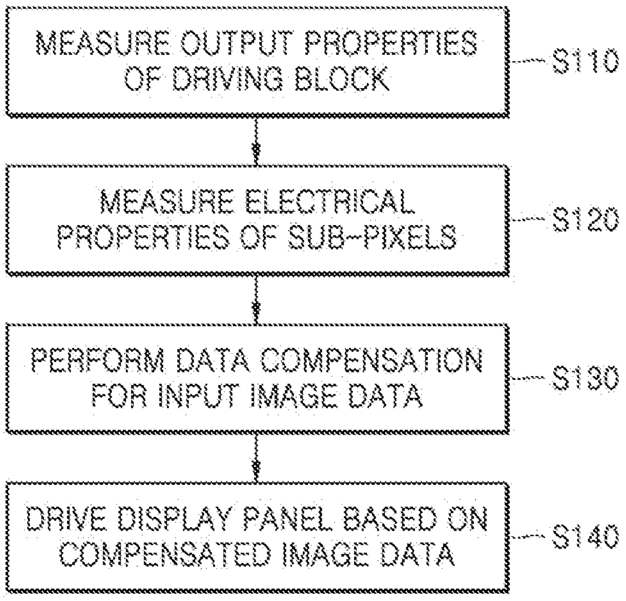
FIG. 12 is a flowchart of an operation method of a display apparatus according to an example embodiment.

FIG. 12 is a flowchart of an operation method of the display apparatus according to an example embodiment. The operation method of FIG. 12 may be performed in the display apparatus 2 of FIG. 2. The operation method of the display apparatus 2 described above may be applied to the present embodiment.

Referring to FIGS. 2 and 12, in operation S110, an output property of the driving block 110 may be measured. Operation S110 may be performed in the calibration mode. For example, the calibration mode may be established in a booting section when the display apparatus 2 is powered on. In the calibration mode, the data driver 100 may use the ADC 21 provided in the sensing block 120 to internally read-out the output property of the driving block 110, for example, voltages according to grayscales of the plurality of DACs 11 provided in the driving block 110. The data driver 100 may transmit the read-out voltage for grayscale of the plurality of DACs 11 to the timing controller 200. The timing controller 200 may extract the offsets according to grayscales of the plurality of DACs 11 based on the voltages according to grayscales of the plurality of DACs 11 and store the extracted offsets according to grayscales, that is, the calibration data, in a memory.

In operation S120, electrical properties of the sub-pixels may be measured. Operation S120 may be performed in the sensing mode. The sensing mode may be established in the booting section at power-on of the display apparatus 2, dummy sections (or horizontal blanking sections) between the frame display sections, and/or the end section at power-off of the display apparatus 2. Mobility sensing may be performed in a first sensing mode, and threshold voltage sensing may be performed in a second sensing mode. The threshold voltage sensing, which requires a considerable time period (tens of seconds to several minutes), may be performed in the end section at power-off. When the sensing mode is established, electrical properties for some of the plurality of sub-pixels provided in the display panel 20 may be measured, and the measuring of the electrical properties for all of the plurality of sub-pixels may be performed through a plurality of sensing operations.

In the sensing mode, the data driver 100 may receive a plurality of pixel voltages through sensing pads, and the ADC 11 may read-out the plurality of received pixel voltages. The data driver 100 may transmit the plurality of read-out pixel voltages to the timing controller 200. The timing controller 200 may extract electrical properties of the sub-pixels such as mobility and threshold voltages based on the plurality of pixel voltages and determine a compensation value for each of the plurality of sub-pixels based on a result of the extraction. In some embodiments, the timing controller 200 may determine a compensation value for each of the plurality of sub-pixels based on the electrical properties of the sub-pixels and an output property of the driver. When determining the compensation value, the timing controller 200 may refer to calibration data stored in the memory. The timing controller 200 may store, in the memory, compensation data including a compensation value for each of the plurality of sub-pixels.

In operation S130, data compensation, that is, external compensation, may be performed for input image data. The timing controller 200 may compensate the input image data based on the output properties of the driving block 110 and the electrical properties of the sub-pixels. The timing controller 200 may compensate the input image data based on compensation data stored in the memory or compensate the input image data based on the compensation data and the calibration data. When the data compensation is performed, not only the electrical properties of the sub-pixels but also the output properties of the driver are compensated, and thus, the accuracy of the data compensation may be improved.

In operation S140, the display panel 20 may be driven based on the compensated image data. The timing controller 200 may transmit the compensated image data to the data driver 100, the data driver 100 may convert the compensated image data to data voltages and provide the data voltages to data lines of the display panel. As the compensated image data includes data value compensated according to the electrical properties of the sub-pixels and the output properties of the driving block 110, the image quality of the display panel 20 may be improved.

Figure 13:
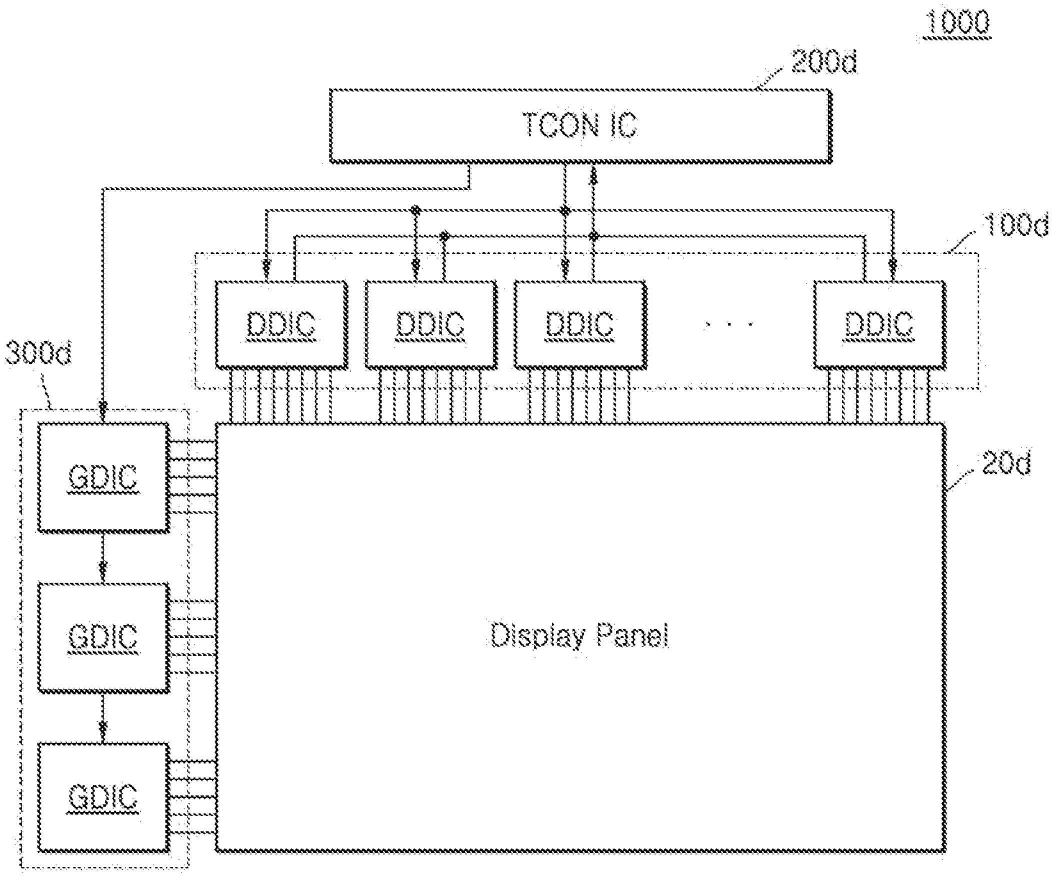
FIG. 13 shows an embodiment of a display apparatus according to an example embodiment.

FIG. 13 is an example of a display apparatus according to an example embodiment. A display apparatus 1000, which includes a display panel 20*d* having a medium or large size, may be applied to a television, a monitor, and the like.

Referring to FIG. 13, the display apparatus 1000 may include a data driver 100*d*, a timing controller 200*d*, a gate driver 300*d*, and the display panel 20*d*.

The data driver 100*d* may include a plurality of data driving ICs (DDICs), mounted in a circuit film such as a tape carrier package (TCP), chip on film (COF), or flexible print circuit (FPC), attached to the display panel 20*d* in a tape automatic bonding (TAB) method, or mounted on a non-display area of the display panel 20*d*.

The gate driver 300*d* may include a plurality of gate driving ICs (GDICs), mounted in a circuit film to be attached to the display panel 20*d* in the TAB method, or mounted on a non-display area of the display panel 20*d* in the COG method. Alternatively, the gate driver 300*d* may be directly formed on a lower substrate of the display panel 20*d* in a gate-driver in panel (GIP) method. The gate driver 300*d* is formed in the non-display area out of a pixel array, in which the sub-pixels SPX are formed in the display panel 20*d*, and may be formed in a thin-film transistor (TFT) process the same as that of the sub-pixels.

The timing controller 200*d* may include one or more ICs or modules. The timing controller 200*d* may communicate with the plurality of data driving ICs (DDICs) and the plurality of gate driving ICs (GDICs) through an established interface.

The timing controller 200*d* may divide image data received from outside and provide a plurality of divided image data respectively to the plurality of data driving IC (DDIC). In addition, the timing controller 200*d* may generate control signals to control the plurality of data driving ICs DDICs and the plurality of gate driving ICs GDICs and provide the control signals to the plurality of data driving IC DDICs and the plurality of gate driving ICs GDICs.

Meanwhile, the plurality of data driving ICs (DDICs) may each include a plurality of DACs and one or more ADCs. In the calibration mode, the plurality of data driving ICs (DDICs) may each internally read-out outputs of the plurality of DACs by using the ADC and provide the read-out output of the plurality of DACs to the timing controller 200*d*. In addition, in the sensing mode, the plurality of data driving ICs DDICs may each extract pixel voltages of the sub-pixels of the display panel 20*d* and transmit the extracted pixel voltages to the timing controller 200*d*. The timing controller 200*d* may extract output properties of each of the DDICs, that is, offsets of the plurality of DACs, from the received outputs of the plurality of DACs and extract electrical properties of the sub-pixels from the pixel voltages of the sub-pixels. The timing controller 200*d* may compensate image data based on the electrical properties of the sub-pixels and output properties of each of the DDICs. Accordingly, the accuracy of the data compensation and quality of image of the display apparatus may be improved.

Figure 14:
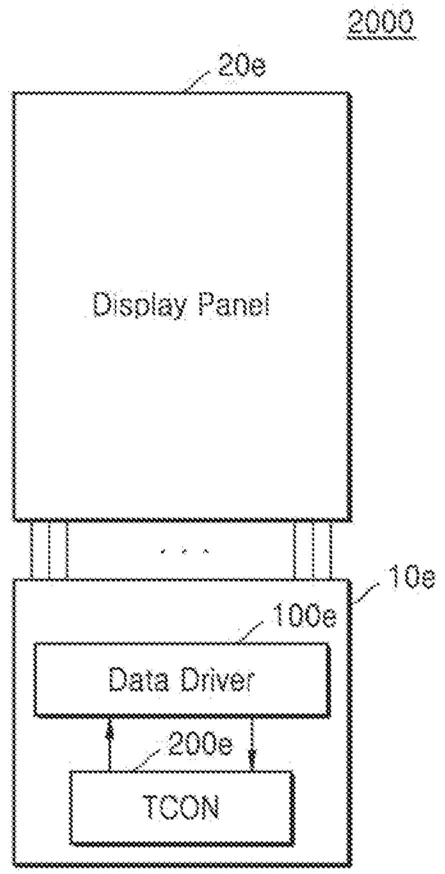
FIG. 14 shows a display apparatus according to an example embodiment.

FIG. 14 shows an example of a display apparatus according to an example embodiment. A display apparatus 2000, which includes a small-size display panel 20*e*, may be applied to a mobile device such as smart phone or a tablet personal computer (tablet PC).

Referring to FIG. 14, the display apparatus 2000 may include a display driving circuit 10*e* and the display panel 20*e*. The display driving circuit 10*e* may include one or more ICs, mounted in the circuit film such as TCP, COF, FPC, attached to the display panel 20*d* in the TAB method or mounted on a non-display area of the display panel 20*d* in the COG method.

The display driving circuit 10*e* may include a data driver 100*e* and a timing controller 200*e* and further include a gate driver. In the embodiment shown in FIG. 14, the gate driver may be mounted in the display panel 20*d*.

The data driver 100*e* may include a plurality of DACs and one or more ADCs. In the calibration mode, the data driver

100e may internally read-out the outputs of the plurality of DACs by using the ADC and transmit the read-out outputs of the plurality of DACs to the timing controller 200e. In addition, in the sensing mode, the data driver 100e may extract the pixel voltages indicating the electrical properties of the sub-pixels of the display panel 20e and transmit the extracted pixel voltages to the timing controller 200e. The timing controller 200e may extract the electrical properties of the sub-pixels of the display panel 20e and the output properties of the plurality of DACs 11 of the data driver 100e based on the sensing data received from the data driver 100e. The timing controller 200e may compensate image data provided from outside (for example, an external application processor) based on the extracted electrical properties of the sub-pixels and the output properties of the plurality of DACs. The timing controller 200e may provide the compensated image data to the data driver 100e, and the data driver 100e may drive the display panel 20e based on the compensated image data. As compensation for the image data is performed based on the electrical properties of the sub-pixels and the output properties of the plurality of DACs, the accuracy of the data compensation and the quality of image of the display apparatus may be improved.

While the inventive concept has been particularly shown and described with reference to embodiments thereof, it will be understood that various changes in form and details may be made therein without departing from the spirit and scope of the following claims.

What is claimed is:

1. A display driving circuit configured to drive a display panel, the display panel comprising a plurality of data lines, a plurality of sensing lines, and a plurality of sub-pixels connected to the plurality of data lines and the plurality of sensing lines, the display driving circuit comprising:

a data driver integrated circuit configured to drive the plurality of data lines, wherein the data driver integrated circuit comprises:

a driving block comprising a plurality of digital-analog converters (DACs), each of the plurality of DACs converting sub-pixel data that is received to a grayscale voltage, the driving block being configured to provide the grayscale voltages output from the plurality of DACs to the plurality of data lines;

a sensing block configured to measure the grayscale voltages output from the plurality of DACs in a first operation mode and measure pixel voltages of the plurality of sub-pixels received from the plurality of sensing lines in a second operation mode; and a plurality of first switches, each connected between a corresponding DAC among the plurality of DACs and the sensing block, wherein the plurality of first switches are turned on to provide the grayscale voltages from the plurality of DACs to the sensing block in the first operation mode and turned off in the second operation mode.

2. The display driving circuit of claim 1, wherein the grayscale voltages from the plurality of DACs are provided to the sensing block through the plurality of first switches internally in the data driver integrated circuit in the first operation mode.

3. The display driving circuit of claim 1, further comprising:

a plurality of second switches, each connected between a corresponding DAC among the plurality of DACs and a corresponding data line among the plurality of data lines, wherein the plurality of second switches are turned off in the first operation mode and turned on in the second operation mode.

4. The display driving circuit of claim 1, wherein the sensing block comprises an analog-digital converter (ADC) to convert received analog signals to digital signals.

5. The display driving circuit of claim 1, wherein, in the first operation mode, the plurality of first switches are sequentially turned on, and the sensing block sequentially measures the grayscale voltages output from the plurality of DACs.

6. The display driving circuit of claim 1, wherein the sensing block comprises:

a plurality of sampling/hold circuits, each configured to sample and maintain an analog signal;

an analog-digital converter (ADC) configured to convert the analog signals to digital signals; and a multiplexer configured to sequentially provide the analog signals from the plurality of sampling/hold circuits to the ADC.

7. The display driving circuit of claim 6, wherein the plurality of sampling/hold circuits sample the grayscale voltages output from the plurality of DACs received through the plurality of first switches in the first operation mode and sample the pixel voltages of the plurality of sub-pixels received through the plurality of sensing lines in the second operation mode.

8. The display driving circuit of claim 1, wherein each of the plurality of DACs comprises:

a decoder configured to select a voltage corresponding to the sub-pixel data that is received, from among a plurality of grayscale voltages; and a buffer configured to output the voltage that is selected as the grayscale voltage.

9. The display driving circuit of claim 1, wherein:

in the first operation mode, each of the plurality of DACs is configured to output all of the grayscale voltages for all grayscales represented by the sub-pixel data, and the sensing block is configured to read-out all of the grayscale voltages.

10. The display driving circuit of claim 1, wherein all grayscales represented by the sub-pixel data are classified into a plurality of grayscale groups, and in the first operation mode, each of the plurality of DACs is configured to output a representative grayscale voltage for each of the plurality of grayscale groups, and the sensing block is configured to read-out a plurality of representative grayscale voltages for the plurality of grayscale groups.

11. The display driving circuit of claim 10, wherein ranges of low grayscale groups in a low grayscale region or high grayscale groups in a high grayscale region from among the plurality of grayscale groups are relatively smaller than ranges of intermediate grayscale groups of an intermediate grayscale region.

12. The display driving circuit of claim 1, further comprising:

a timing controller configured to receive the grayscale voltages from the sensing block measured in the first operation mode, receive the pixel voltages from the sensing block measured in the second operation mode, extract offsets for grayscales for each of the plurality of DACs based on the grayscale voltages, and extract electrical properties of each of the plurality of sub-pixels based on the pixel voltages.

13. The display driving circuit of claim 12, wherein the timing controller is configured to perform data compensation for a plurality of pieces of sub-pixel data corresponding to the plurality of sub-pixels based on the offsets and the electrical properties.

14. A display driving circuit comprising:

a data driver comprising a plurality of digital-analog converters (DACs) configured to generate a plurality of data voltages, and configured to drive a display panel based on the plurality of data voltages from the plurality of DACs, wherein the data driver internally reads the plurality of data voltages output from the plurality of DACs in a calibration mode, and reads a plurality of pixel voltages received from a plurality of sub-pixels of the display panel in a sensing mode; and a timing controller configured to perform data compensation for image data provided to the data driver based on electrical properties of the plurality of sub-pixels and based on output properties of the plurality of DACs extracted based on the plurality of data voltages, and provide the compensated image data to the data driver, wherein the data driver further comprises:

an analog-digital converter (ADC) configured to read-out the plurality of data voltages from the plurality of DACs in the calibration mode and read-out the plurality of pixel voltages from the plurality of sub-pixels in the sensing mode; and a plurality of first switches each connected between a corresponding DAC among the plurality of DACs and the ADC, wherein the plurality of first switches are turned on to provide the plurality of data voltages from the plurality of DACs to the ADC in the calibration mode and turned off in the sensing mode.

15. The display driving circuit of claim 14, wherein the plurality of first switches electrically connect the plurality of DACs and the ADC and provide the plurality of data voltages from the plurality of DACs to the ADC in the calibration mode, and block electrical connection between the plurality of DACs and the ADC in the sensing mode.

16. The display driving circuit of claim 14, wherein the ADC receives the plurality of data voltages from the plurality of DACs through the plurality of first switches in the calibration mode and receives the plurality of pixel voltages from the plurality of sub-pixels through a plurality of sensing lines of the display panel in the sensing mode.

17. The display driving circuit of claim 14, wherein the data driver further comprises:

a plurality of second switches each connected between a corresponding DAC among the plurality of DACs and a corresponding data line among a plurality of data lines of the display panel, wherein the plurality of second switches are turned off in the calibration mode and turned on in the sensing mode.

18. The display driving circuit of claim 14, wherein the data driver further comprises a grayscale voltage generating circuit configured to generate a plurality of grayscale voltages and provide the plurality of grayscale voltages to each of the plurality of DACs, wherein each of the plurality of DACs, in the calibration mode, is configured to output voltages, as data voltages, corresponding to at least some grayscale voltages from among the plurality of grayscale voltages.

19. The display driving circuit of claim 18, wherein the output properties of the plurality of DACs comprise offsets according to grayscales for each of the plurality of DACs.

20. The display driving circuit of claim 14, further comprises:

a gate driver configured to drive a plurality of first gate lines and a plurality of second gate lines connected to the plurality of sub-pixels of the display panel, wherein the gate driver provides a gate-off voltage to the plurality of first gate lines and the plurality of second gate lines in the calibration mode, and provides a pulse of a gate-on voltage to each of the plurality of first gate lines and each of the plurality of second gate lines during a corresponding driving period of each of the plurality of first gate lines and each of the plurality of second gate lines in the sensing mode.

* * * * *